US006975205B1

(12) United States Patent
French et al.

(10) Patent No.: US 6,975,205 B1
(45) Date of Patent: *Dec. 13, 2005

(54) CART RETURN CREDIT SYSTEM

(75) Inventors: John French, San Diego, CA (US); Philip Witham, Portland, OR (US)

(73) Assignee: Carttronics, LLC, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/535,076

(22) Filed: Mar. 23, 2000

Related U.S. Application Data

(63) Continuation-in-part of application No. 09/153,912, filed on Sep. 16, 1998, now Pat. No. 6,486,768.

(51) Int. Cl.[7] .............................................. H04Q 19/00
(52) U.S. Cl. ...................... 340/5.92; 194/211; 705/14; 235/383; 340/518.5
(58) Field of Search ............................... 340/5.9, 5.91, 340/5.92, 568.5; 705/14; 194/211; 235/383

(56) References Cited

U.S. PATENT DOCUMENTS

| 3,882,982 | A |   | 5/1975  | Smith ........................... 194/4 C  |
| 3,897,863 | A |   | 8/1975  | Peggs ........................... 194/4 R  |
| 3,938,638 | A |   | 2/1976  | Moule ........................... 194/4 C  |
| 4,424,893 | A |   | 1/1984  | Gillet ........................... 194/4 C  |
| 4,470,495 | A |   | 9/1984  | Unger ........................... 194/4 C  |
| 4,549,182 | A |   | 10/1985 | Gillet ........................... 348/942  |
| 4,572,347 | A |   | 2/1986  | Eisermann ................... 194/205  |
| 4,623,877 | A | * | 11/1986 | Buckens ....................... 340/572  |
| 5,056,019 | A |   | 10/1991 | Schultz et al. ............... 364/405  |
| 5,119,087 | A |   | 6/1992  | Lucas ........................ 340/825.35  |
| 5,360,094 | A |   | 11/1994 | Adams et al. ............... 194/212  |
| 5,485,006 | A |   | 1/1996  | Allen et al. ................ 250/222.1  |
| 5,526,916 | A |   | 6/1996  | Amdahl et al. .............. 194/211  |
| 5,592,560 | A |   | 1/1997  | Deaton et al. ............... 382/100  |
| 5,687,322 | A |   | 11/1997 | Deaton et al. ............... 382/100  |
| 5,708,782 | A | * | 1/1998  | Larson et al. ................ 395/214  |
| 6,154,879 | A | * | 11/2000 | Pare et al. ........................ 902/3  |

FOREIGN PATENT DOCUMENTS

| DE | 30 02 798 A 1   | 7/1981  | ............ G07C 9/00  |
| DE | 31 30 543 A 1   | 2/1983  | ........... A47F 10/04 |
| DE | 196 25 525 A1   | 1/1998  |                         |
| EP | 0 025 754 B1    | 9/1980  | ............ G07F 7/06  |
| GB | 2 122 792 A     | 1/1984  | ............ G07F 7/06  |
| WO | WO 85/00961     | 3/1985  | ........... A47F 10/04 |
| WO | WO 97/11441     | 3/1997  |                         |
| WO | WO 98/51197     | 11/1998 |                         |

* cited by examiner

*Primary Examiner*—Michael Horabik
*Assistant Examiner*—M Shimizu
(74) *Attorney, Agent, or Firm*—Gordon & Rees LLP

(57) ABSTRACT

A system and method for providing an incentive to a customer of a store to return a shopping cart to a cart return location. The system generates a cart return signal. The system determines whether a cart is being removed from or returned to the cart corral. Alternatively, a radio frequency identification system may be used to detect return of a cart. The shopper is credited with points or credits in a frequent shopper or reward program for returning the shopping cart to the cart return location. The cart return system may be readily configured to integrate with a wide range of existing, or new frequent shopper or loyalty programs.

15 Claims, 14 Drawing Sheets

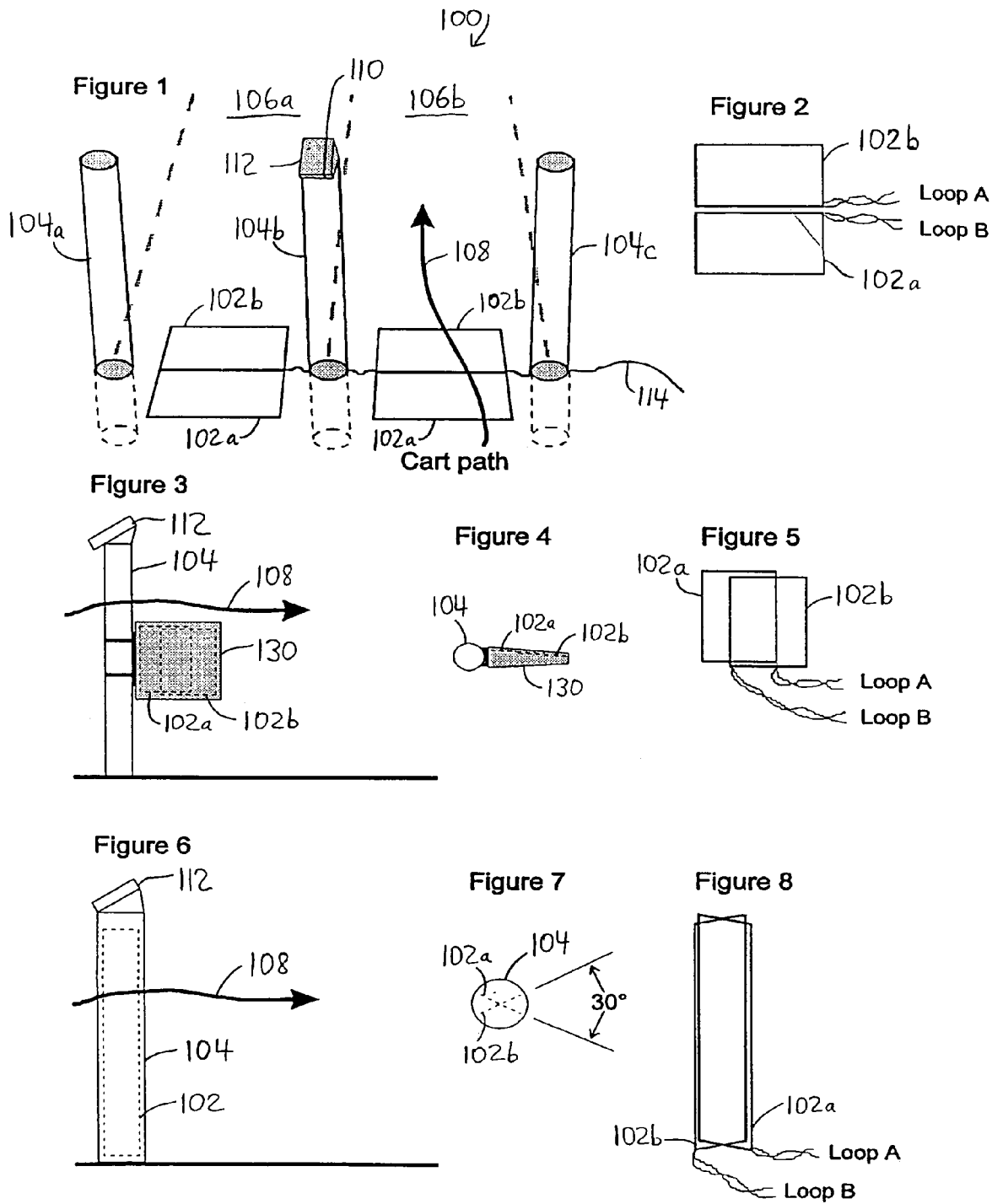

Figure 12  Cart Detector circuit
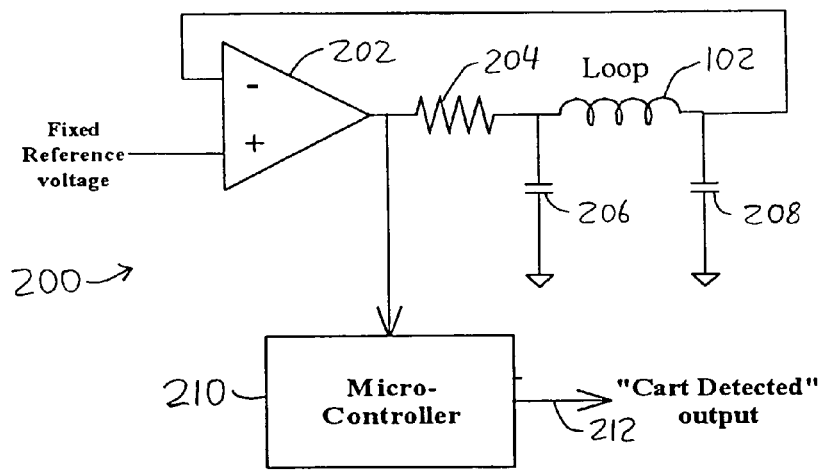
Figure 13  System Electronics
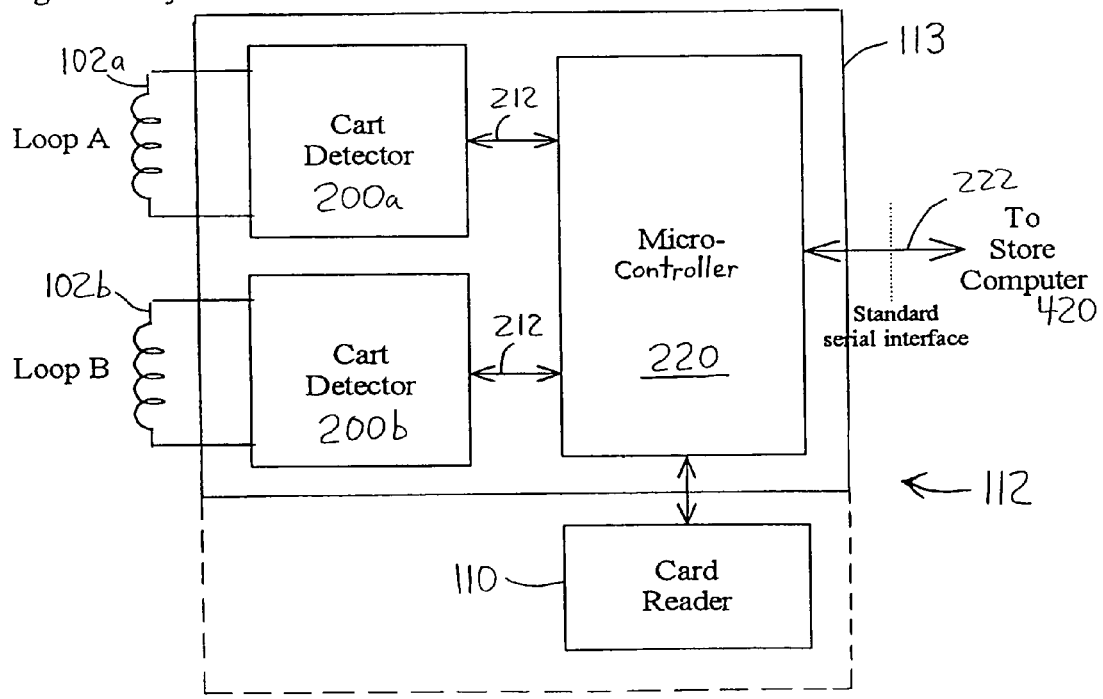

CART RETURN CREDIT SYSTEM

RELATED APPLICATION

This is a continuation-in-part application of application Ser. No. 09/153,912, entitled CART RETURN LOYALTY CREDIT SYSTEM, filed Sep. 16, 1998, now U.S. Pat. No. 6,486,768.

BACKGROUND OF THE INVENTION

1. Field of the Invention

The present invention generally relates to a reward system and method for wheeled vehicles, and more specifically, to a way to encourage the return of a shopping cart to a cart return location.

2. Description of the Related Technology

Wheeled shopping carts are conventionally provided by supermarkets, discount stores and other retail stores for the convenience of shoppers such that relatively large loads of goods can be collected, paid for and then wheeled out to the shoppers vehicle for unloading. A few shoppers will voluntarily return a cart to a central cart return location, such as a cart corral. Typically, however, the shopper leaves the cart in the vicinity of where the vehicle is parked. The empty cart must then be collected by store personnel and returned to the store for subsequent use. Substantial costs may be incurred associated with the process of retrieving the carts from the far corners of the site and collecting them into a central cart corral or a cart line in front of the store. A typical store may spend from one to six person-years in the collection process, and incur additional indirect costs associated with injury and disability claims. Worldwide, labor costs of cart collection add up to millions of dollars.

Additionally, some carts may be removed from the store parking lot. For example, a shopper without a vehicle may use the cart to transport goods back to his home and then abandon the cart. This can result in permanent loss of the cart. Furthermore, thieves may intentionally abscond with carts for the purpose of later resale to other retailers. Loss of shopping carts results in substantial financial loss to the retailer, since each cart is a relatively expensive piece of equipment.

According to the Food Marketing Institute (FMI) in one recent year, U.S. retailers annually lost approximately 11% of their carts with a value of $185 million, plus another $117 million in cart retrieval expenses. Because it is common for shoppers to "borrow" carts to transport their purchases home or to a transit stop, retailers must contract for regular cart retrieval services. Retrieval contractors comb their neighborhoods several times per day or week, at substantial cost to the retailer. The total impact is typically thousands of dollars per site per year. Once off-site, carts are often taken great distances, experiencing worn wheels and other damage. Rough handling during the collection process often further damages those carts that are retrieved. Extra cleaning and repair that may be required following retrieval could easily add thousands of dollars of additional expenses per store per year. Furthermore, to compensate for carts that are off-site, retailers typically maintain excess cart inventories, often 10% to 20% over their actual need, to ensure that enough carts are available during peak shopping hours. At some sites, the total of all these costs may exceed $100,000 per site.

Numerous proposals have been made in the past for devices to deter shoppers or others from removing carts from the immediate vicinity or parking lot of a store. Such devices typically include some type of wheel locking mechanism which is activated when the cart crosses a boundary of some type around the perimeter of the parking lot or travels a fixed distance from a store exit. However, these concepts do not provide incentives to discourage removal of a cart from the lot or to return the cart to the cart corral.

One method increasingly used by retailers to encourage repeat business is a frequent shopper program, also known as a reward or loyalty program. In such a program, a customer is typically issued a card having a unique customer identification code. The card is issued after the customer provides identifying information and usually some demographic information to the issuing store. This frequent shopper or reward card may be of various types, such as magnetic stripe, bar-code, or smart card technology having a non-volatile memory (proximity, and so forth).

According to In-Store, the newsletter of In-Store Marketing & Business, a current survey of frequent shopper or reward program penetration shows that there are now more than 7,750 supermarkets in the United States that have card-based frequent shopper programs, which represents about 26% of all supermarkets. This is up from 19% (5,867 stores) of total United States supermarkets in the 1st Quarter of 1997. The growth in loyalty card programs is similar throughout the developed countries of the world. A supermarket is defined as a grocery store with more than $2 million in annual sales.

The use of these reward programs continues to grow at a rapid pace. In 1998, fifty chains with twenty or more stores and seventy-five retailers with fewer than twenty stores have or are in the process of rolling out frequent shopper programs. Over 72% of the frequent shopper store count is made up by chains with more than $2.0 billion of annual sales. The percentage of frequent shopper penetration in 1998 represented 22.5% of All Commodity Volume (ACV) in the United States, which is up from 17.4% in the first quarter of 1997. It is estimated that 3,600 additional supermarkets will add frequent shopper programs soon, which would mean that about 38% of all supermarkets will have a reward program. Similar growth in loyalty card programs may be anticipated throughout the developed countries of the world.

ACNielsen performs an annual "Frequent Shopper Programs" study. The ability to use a frequent shopper or loyalty card was cited as more important by card holders than every-day low pricing or customer service. When card holders initially joined their shopper card programs, savings was cited as the primary reason by nearly 75% of card holders, with check cashing the number two reason at 15%. Today, many card holders have had a frequent shopper card over 12 months, and savings continues to be the primary reason for card usage. Over 50% of the card holders are primarily looking for special deals on products. Although the most often cited reason for shopping in a particular store is still location, the ability to use a frequent shopper card ranked third in importance, next to location and store deals.

In 1998, 55% of households in the United States have at least one grocery store loyalty card. A similar ACNielsen study in 1997 showed that only 35% of households had a card. The highest percentage of card holders was found in Chicago, with 94% of households having at least one store card. Other top markets include Los Angeles, N.Y., Buffalo/Rochester and Charlotte, N.C.

A system and method is desired that would enlist the help of customers in the cart collection process. To accomplish this, such a system and method would elicit supportive behavior of a shopper by providing incentives to return a shopping cart to a cart return location. These incentives would provide a reward to the shopper for returning a shopping cart and to encourage repeat business. The system and method would thus provide direct benefits to both the customer and the store operator.

It is also desired to have a shopping cart return system that can be associated with a frequent shopper or rewards program. Such a cart return system would be able to integrate with the existing store infrastructure so as to minimize store expenses and not require customers to learn a totally new system or new procedure. A variety of different ways to sense the return of a cart, to obtain a customer identification, and to provide the reward are also desired.

SUMMARY OF THE INVENTION

One aspect of the present cart return credit system invention is a system consisting of a cart sensor and a card reader/scanner/detector or other interface (e.g., a keypad, biometrics sensor, Bluetooth protocol transceiver, etc.) configured to obtain a customer identification (ID) which can be retrofitted to existing cart corrals. An optional output interface may be included in the system. The output interface may be a device that is used as backup to provide a reward to the customer if a link to a store computer or a computing environment or the store computer/computing environment itself is not functioning properly. Alternatively, the output device may be used as the primary source of a reward to the customer, such as a token, coupon, or certificate. The cart sensor may use a detection loop, a loop oscillator circuit and a detector to detect a change in inductance of the loop when a cart is returned to the cart corral. Alternatively, each cart may include a radio frequency identification (RFID) tag, such as attached to the frame or embedded in a wheel or caster of the cart. A RFID transceiver or receiver may be used in conjunction with a antenna located at the entrance to the cart corral to detect that a cart is returned to the corral. By use of the RFID tags on the carts, a current cart inventory may be maintained, and a chronological cart return record may be generated to prevent fraudulent credits from being issued. When a cart is detected as being returned to the cart corral, the customer ID obtained from the reader or other interface is then sent to the store computer or a computing environment via a wireless or wired link.

In another aspect of the present invention there is an integrated system of sensors, card readers or other customer identification interfaces, and/or other components, such as described in the previous paragraph, which may be newly constructed or assembled.

In another aspect of the present invention there is a cart return system, comprising a sensor which is activated when a cart is returned to a cart corral, a plurality of customer identification signals which are manually entered at the cart corral or wirelessly transmitted from a customer device, and a data processing section receiving signals from the sensor and the customer input signals so as to associate the returned cart with a customer identification for a customer rewards program.

In another aspect of the present invention there is a cart return system, comprising a sensor which is activated when a cart is returned to a cart corral, a first interface which receives a first set of identification signals from a customer, a second interface which receives a second set of customer identification signals from the customer; and a data processing section associating at least one set of customer identification signals with a cart returned signal received from the sensor for a customer rewards program.

In another aspect of the present invention there is a cart return system for use by a store, the system comprising a detection loop arranged at the entrance to a cart return location, a cart detection circuit connected to the detection loop being configured for detecting a change of inductance of the loop and identifying a cart detected condition, and a processing circuit, connected to the cart detection circuit, being configured for identifying a cart return condition in response to the cart detected condition, wherein the processing circuit is configured to receive a customer identification.

BRIEF DESCRIPTION OF THE DRAWINGS

FIG. 1 is a perspective view diagram for one embodiment of a sensor, card reader and system electronics arrangement used with a cart corral in a cart return loyalty credit system of the present invention.

FIG. 2 is a top plan view diagram of the sensor loop configuration shown in FIG. 1.

FIG. 3 is a side elevation view diagram for a second embodiment of a sensor, card reader and system electronics arrangement used with a cart corral.

FIG. 4 is a top plan view diagram of the pole and sensor loop configuration shown in FIG. 3.

FIG. 5 is a side elevation view diagram of the sensor loop configuration shown in FIG. 3.

FIG. 6 is a side elevation view diagram for a third embodiment of a sensor, card reader and system electronics arrangement used with a cart corral.

FIG. 7 is a top plan view diagram of the pole and sensor loop configuration shown in FIG. 6.

FIG. 8 is a perspective view diagram of the sensor loop configuration shown in FIG. 6.

FIG. 12 is a diagram of one embodiment of a cart detector circuit utilized by the system electronics unit shown in any of FIGS. 1, 3, 6, 10 or 11.

FIG. 13 is a block diagram of one embodiment of the system electronics unit and card reader shown in any of FIGS. 1, 3, 6, 10 or 11.

DETAILED DESCRIPTION OF THE PREFERRED EMBODIMENTS

Figure 9:
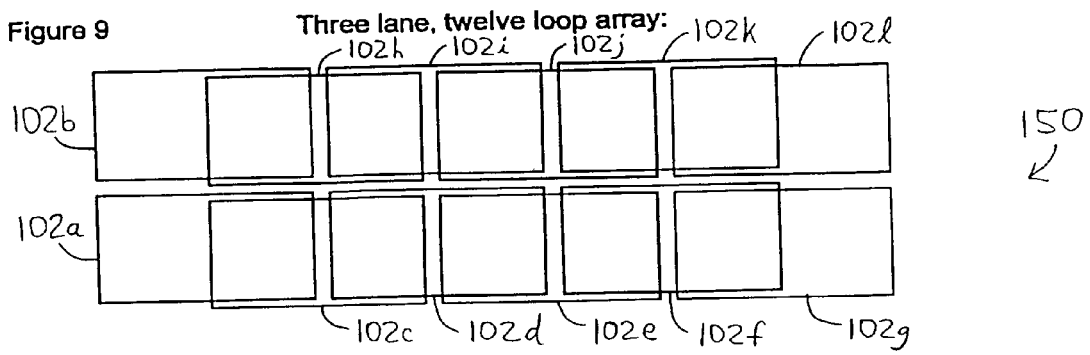
FIG. 9 is a top plan view diagram for a fourth embodiment of a sensor loop configuration used with a cart corral.

The following detailed description of the preferred embodiments presents a description of certain specific embodiments to assist in understanding the claims. However, the present invention can be embodied in a multitude of different ways as defined and covered by the claims. Reference is now made to the drawings wherein like numerals refer to like parts throughout.

The purpose of the cart sensor system is to sense or register the return of the cart (the preferred customer behavior) and to enable the credit granting system whereby the customer receives credits or points or other benefits in return for their replacing the cart in the designated place.

The detailed description is organized into the following sections: Magnetic Stripe Cards and Readers, Smart Cards and Readers or Reader/Writers, Wireless Communication Protocols and Technology, Shopping Carts, Physical Layouts of Cart Corral Sensors and Input & Output Interfaces/Electronics Station, Cart Detector Circuit and System Electronics, Software Functions, and Store Infrastructure.

Magnetic Stripe Cards and Readers

Data can be encoded on magnetic stripe cards using a proprietary methodology or by employing an open or standard encoding pattern. The device that encodes data on a magnetic stripe is termed an encoder. The device that reads or decodes data from a magnetic stripe is termed a reader. There are common standards by which magnetic stripe cards are encoded. Such standards are created by organizations such as ANSI (American National Standards Institute) and the ABA (American Banking Association). Virtually all magnetic stripe cards, with the exception of those used for security or proprietary purposes, utilize these standards. Therefore, assuming a card has been encoded to the typical standard, any brand or model of reader built to a standard will be capable of reading (decoding) the magnetic stripe.

Standards have been developed for encoding three "tracks" on a magnetic stripe card. A track is basically a single physical line on the magnetic stripe where data are encoded. The tracks are referred to as Track 1, Track 2 and Track 3. What are laid-down on the tracks are bits—the off or on switches (zeroes and ones) that make up computer binary language. The density to which the bits are recorded are logically referred to as BPI, or bits-per-inch. What follows is an explanation of what makes up each track and what it normally encodes.

Track 1 is an alphanumeric track, recorded at 210 BPI at 7 bits per character. Its limit is 79 characters. In the case of a credit card, this track normally encodes the cardholder's name, card number and card expiry date. Included in the 79 characters are a number of delimiter and placeholder characters found on the track.

Track 2 is a numeric-only track, recorded at 75 BPI at 5 bits per character. Its limit is 40 characters. Track 2 on credit cards contains the cardholder's card number and expiry date. While these two pieces of data are also found on Track 1, the reasons for placing them on Track 2 are twofold. Firstly, it provides a degree of redundancy on the card, should one of the tracks be erased or become unreadable. The second reason is that a number of states and other jurisdictions do not allow for the non-discretionary recording of a person's name during a financial transaction.

Track 3 which is seldom used is numeric-only in nature, recorded at 210 BPI, 5 bits per character. It is termed the "thrift track". Up to 107 characters can be placed on Track 3.

Magnetic card readers and encoders can be purchased as single track, dual track and triple track. In the case of a dual track reader or encoder, it could be tracks 1 & 2, or 2 & 3.

As the name implies, magnetic stripe readers only read already-encoded magnetic stripes and they are used almost exclusively on-line (attached to a personal computer (PC) terminal or cash register). In a retail store, the reader and computing device form a part of a point-of-sale (POS) system. They are normally interfaced with a computer device either through an RS-232 serial connection, or via a keyboard wedge. This latter interface is most common in PC applications. In this case, the card reader shares the PC's keyboard port and all scanned data are accepted by the PC as if they were keyed in. Serial readers almost always require an external AC/DC power supply. Keyboard wedge readers "borrow" power from the keyboard port.

On-line magnetic stripe reader systems come in two basic styles: integrated decoder and non-integrated decoder. A decoder is the electronic circuitry that decodes the "raw" electrical signals generated by the reader. The main advantage of the integrated, one-piece systems is the low cost. Their main disadvantage is that should one of the components (reader or decoder) fail, the entire system will probably need to be replaced.

Most magnetic stripe readers are of the "swipe" type, where the card is manually drawn through a slot in the reader. One swipe-type magnetic card reader that is available from Panasonic is model ZU-M1242S1. Insertion readers, common on ATM machines, automated gas pumps and kiosks, are also available. Typically, insertion readers are integrated into other equipment, like kiosks or automatic teller machines (ATMs).

Smart Cards and Readers or Reader/Writers

A smart card is similar in appearance to a traditional magnetic stripe card, but unlike a traditional magnetic stripe card, the smart card stores information on an integrated circuit chip embedded within the card, rather than on the magnetic stripe on the surface. While a typical magnetic stripe card stores approximately 212 bytes of information, generally consisting of a user's name, account and personal identification number offset, a smart card may store 64 kilobytes or more of information, which is about 300 times that of a magnetic stripe card such as a traditional credit card. The intelligence of the integrated circuit chip allows smart cards to protect the stored information from damage or theft. For this reason, smart cards are more secure than magnetic stripe cards, which carry information on the outside of the card and can therefore be more easily copied or accidentally erased.

Various businesses and services are discovering the benefits from a variety of applications offered by the smart cards. Smart cards have been used in Europe and Asia for more than 15 years. Although relatively new to the US and Latin American countries, smart card growth is projected to 4.7 billion cards by year 2002 which is an average annual increase of 45 percent.

The smart card supports specific needs a business may have, such as a reward program. Smart Cards are categorized into memory cards or microprocessor cards. Though they both look alike, memory cards, such as phone cards, are only able to store data. Microprocessor cards, such as debit/credit cards, can process information with a high level of security. Smart card readers and reader/writers, such as available from Tritheim Technologies, Inc., operate with microprocessor cards, which process information faster with higher security and deliver more value to users. Tritheim's readers also work with Asynchronous, Synchronous, I$^2$C, and Extended I$^2$C Cards. To make a processor and a smart card communicate, the smart card is placed in a smart card reader, which is connected to the processor.

Smart cards may be used to meet the needs of small retailers seeking to improve customer retention and to reward customer loyalty. One smart card manufacturer is PubliCARD, Inc. which markets a smart card called the SmartReward. Smart cards are also available from Oberthur Card Systems and other companies. The smart card product provides a cost-effective way of attracting and retaining customer loyalty, while also allowing the creation of an extensive customer database. Additionally, the product may be configured to allow customers to earn loyalty points redeemable only at the point of sale, promoting repeat customers at the particular store location. Smart cards may enable a reward or loyalty program to instantly credit a customer's smart card with reward points or credits. The loyalty card is capable of storing and managing loyalty points and benefits in real-time.

Wireless Communication Protocols and Technology

A business having a reward program may allow customers to use other devices for providing their customer ID and optionally store their reward points or credits on these devices. Many customers now have personal handheld communication devices, such as intelligent wireless phones having storage capabilities (e.g., smart phones) and personal handheld computing devices having communication capabilities, such as the Palm Pilot and the Handspring Visor. These and other devices may use the following protocols and technologies.

Wireless Application Protocol

The Wireless Application Protocol (WAP) is a secure specification that allows users to access information instantly via handheld wireless devices such as mobile phones, pagers, two-way radios, smartphones and communicators. WAP supports most wireless networks, including CDPD, CDMA, GSM, PDC, PHS, TDMA, FLEX, ReFLEX, iDEN, TETRA, DECT, DataTAC, and Mobitex. WAP is supported by various software operating systems. Ones specifically engineered for handheld devices include PalmOS, EPOC, Windows CE, FLEXOS, OS/9, and JavaOS.

Although WAP supports HTML and XML, the WML language (an XML application) is specifically devised for small screens and one-hand navigation without a keyboard. WML is scalable from two-line text displays up through graphic screens found on items such as smart phones and communicators. WAP also supports WMLScript, which is similar to JavaScript, but makes minimal demands on memory and CPU power because it does not contain many of the unnecessary functions found in other scripting languages. The WAP initiative was started by Unwired Planet, Motorola, Nokia, and Ericsson. The WAP 1.2 Specification Suite is accessible on the Web at www.wapforum.org/what.

Bluetooth Technology

Bluetooth refers to a short-range radio technology aimed at simplifying communications among devices and between devices and the Internet. It also aims to simplify data synchronization between devices and other computers. Products with Bluetooth technology must be qualified and pass interoperability testing by the Bluetooth Special Interest Group prior to release. The Bluetooth 1.0 specification consists of two documents: the Foundation Core, which provides design specifications, and the Foundation Profile, which provides interoperability guidelines. The specification may be accessed on the Web at www.bluetooth.com. Bluetooth's founding members include Ericsson, IBM, Intel, Nokia and Toshiba.

Bluetooth is a proposed Radio Frequency (RF) specification for short-range, point-to-multipoint voice and data transfer. Bluetooth can transmit through solid, non-metal objects. Its nominal link range is from 10 cm to 10 m, but may be extended to 100 m by increasing the transmit power. It is based on a low-cost, short-range radio link, and facilitates ad hoc connections for stationary and mobile communication environments.

Bluetooth characteristics include:

Operates in the 2.4 GHz Industrial-Scientific-Medical (ISM) band.

Uses Frequency Hop (FH) spread spectrum, which divides the frequency band into a number of hop channels. During a connection, radio transceivers hop from one channel to another in a pseudo-random fashion.

Supports up to 8 devices in a piconet (two or more Bluetooth units sharing a channel).

Built-in security.

Non line-of-sight transmission through walls and briefcases.

Omni-directional.

Supports both isochronous and asynchronous services; easy integration of TCP/IP for networking.

Regulated by governments worldwide.

Bluetooth enables portable electronic devices to connect and communicate wirelessly via short-range, ad hoc networks. It is a universal radio interface in the 2.45 GHz frequency band that has gained the support of Ericsson, Nokia, IBM, Toshiba, Intel, and many other manufacturers.

Infrared Data Technology

The Infrared Data Association (IrDA) specifies three infrared communication standards: IrDA-Data, IrDA-Control, and a new emerging standard called AIr. The following discussion on IrDA refers to the IrDA-Data standard. In general, IrDA is used to provide wireless connectivity technologies for devices that would normally use cables for connectivity. IrDA is a point-to-point, narrow angle (30° cone), ad-hoc data transmission standard designed to operate over a distance of zero to one meter and at speeds of 9600 bps to 16 Mbps.

Shopping Carts

Shopping carts are provided by a variety of retail businesses to permit their customers to easily collect and move their purchases for transfer to their vehicle. There are several different types of shopping carts available in various sizes and configurations including all metal carts, metal framed carts with plastic baskets, metal with plastic coatings, and some made almost entirely of plastic.

Cart Corral Sensors and Input & Output Interfaces/Electronics Station—Physical Layouts With the identification technology in mind, and referring to FIG. 1, one embodiment of a portion of a cart return loyalty or rewards credit system 100 will be described. One possible embodiment of a cart sensor is a set of inductive loop sensors 102a and 102b buried in the pavement of a parking lot by cutting slots in the pavement, installing the wires, and filling the slots with paving material such as asphalt. Each loop sensor 102 may be two loop turns of 14 gauge stranded wire in one embodiment. The loop sensors 102 are located between vertical poles or members 104a, 104b and 104c defining one or more distinct lanes 106a and 106b for carts to pass through on a cart path, e.g., path 108. Optionally, the sensors 102 could be located at the entrance(s) to existing cart corrals. One or more customer card readers 110 is/are located nearby, optionally on top of one of the poles 104 in a housing also containing the system's electronics 112. Note that one or more of the poles 104a and/or 104c may be omitted. Furthermore, the system electronics 112 may be mounted on one of the other poles 104a or 104c. Optionally, the loop sensor coils 102 can be built into a flat, thin, rugged plastic case placed directly on the pavement surface, having one or more lanes and sets of coils. A connector 114 connects the electronics unit 112 to a store computer, as will be discussed in conjunction with FIG. 16. Optionally, the electronics unit could use wireless techniques, such as a Proxim RF Ethernet LAN system, to connect to the store computer.

Referring to FIG. 2, the sensor loop configuration shown in FIG. 1 will be described. The loop configuration is illustrated with two separate insulated wire coils 102a and 102b of one or more turns each, adjacent to each other. As a shopping cart passes over this pair of loops, a change in inductance is first detected in one coil, then the other. Which coil "sees" the cart first indicates the direction the cart is moving, i.e., in or out of the cart corral. The wires from these coils run underground and then may run up to the electronics housing 112 (FIG. 1).

Referring to FIG. 3, a second embodiment of a portion of the cart return loyalty credit system 100 will be described. In this embodiment, the two inductive loops 102a and 102b are placed in a rigid case 130, such as durable plastic, mounted vertically on each pole 104 defining a distinct lane 106 as in FIG. 1. Thus there is a sensor case 130 for each lane 106. Referring to FIG. 4, a top view of the pole 104, loops 102a and 102b, and case 130, corresponding to the arrangement of FIG. 3, is shown.

Referring to FIG. 5, a side view of the pole mounted sensor loop configuration of FIGS. 3 and 4 will be described. The configuration is similar to that shown in FIG. 2, but with the two loops 102a and 102b optionally overlapping somewhat for reduced sensor size. A metallic plate shield may be integrated into the sensor case 130 on one of the large sides in order to allow sensing of carts only on one side of the case 130.

Referring to FIG. 6, a third embodiment of a portion of the cart return loyalty credit system 100 will be described. In this embodiment, two inductive loops 102a and 102b are integrated into a non-metallic pole 104, perhaps 4 inches in diameter. One or more of these sensor-poles 104 would define cart lanes 106 as in FIG. 1. The system electronics 112 and card reader may optionally be integrated into the same pole 104.

Referring to FIG. 7, a top view of the pole 104 and the integrated loops 102a and 102b, corresponding to the arrangement of FIG. 6, is shown. The two coils are angled from each other, in this example, approximately 30 degrees to allow the system to sense the direction of cart travel. Other angles may be utilized in other embodiments.

Referring to FIG. 8, a perspective view of the sensor loop configuration for FIGS. 6 and 7 will be described. The loop configuration utilized in FIGS. 6 and 7 is two coils nearly the full height and full inside width of the pole, for maximum sensitivity. Of course, the height and width of the coils may vary from one application to another. The two coils are angled from each other, in this example, about 30 degrees. The difference in angles allows one coil to detect the shopping cart before the other, and hence, the system can determine if the shopping cart is moving in or out of the cart corral.

Figure 10:
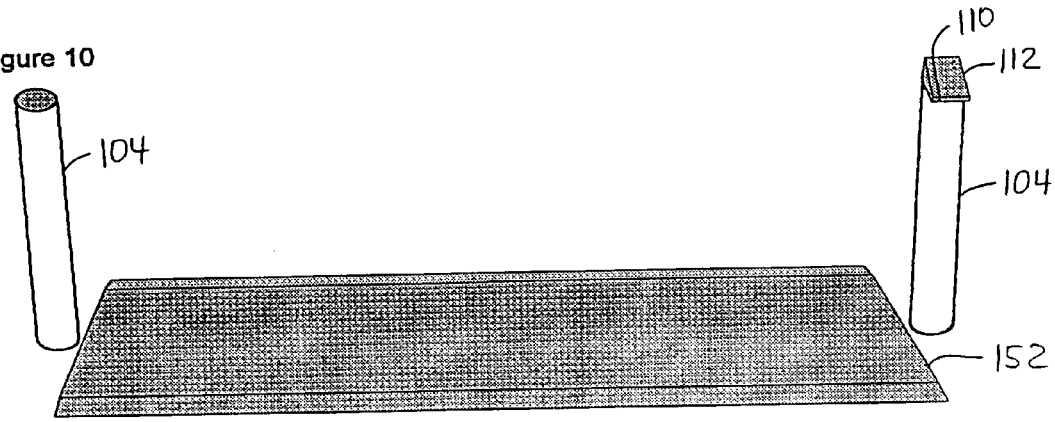
FIG. 10 is a perspective view diagram of a card reader, system electronics and sensor panel arrangement for the sensor loop configuration shown in FIG. 9.

Referring to FIGS. 9 and 10, a fourth embodiment of a portion of the cart return loyalty credit system 100 will be described. In this embodiment, a wide array 150 of inductive loops 102a–102l is molded into a flat plastic panel 152 placed on the pavement surface. Two poles 104 or other guides or markings cause shoppers to return carts over this array 150, but there is a large width between the poles 104, which permits for easy access for shopping carts. The array 150 of individual inductive loop sensors 102 allows the system electronics 112 to track the movement of several carts at once, and to track carts not traveling straight across the sensor. FIG. 9 illustrates one possible configuration of the array 150, among many. Here there is some overlap in width between the coils 102 to increase sensitivity and eliminate "dead zones" (areas of low sensitivity). In one embodiment, a single card reader 110 is used and is possibly integrated with the system electronics unit 112.

In the embodiments of FIGS. 1 and 2, and FIGS. 9 and 10, the loop sensors 102 may optionally be somewhat wider so as to enclose the base of the vertical poles 104 rather than just wide enough to fit between them.

Figure 11:
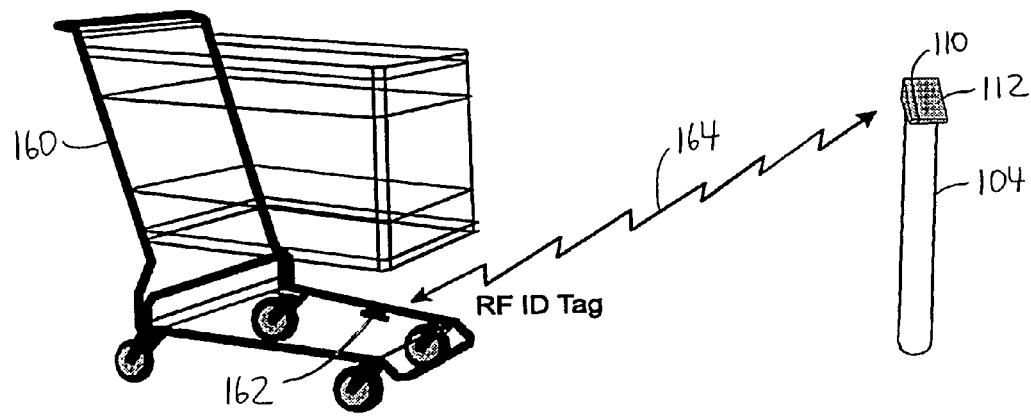
FIG. 11 is a perspective view diagram of a fifth embodiment of a cart, identification (ID) tag, card reader and system electronics arrangement used with a cart corral.

Referring to FIG. 11, a fifth embodiment of a portion of the cart return loyalty credit system 100 will be described. In this embodiment, individual radio frequency (RF) identification (ID) tags 162 are used on each shopping cart 160. The RF ID tags each wirelessly transmitting 164 a unique serial number. When returned to the proximity of the cart corral, electronics unit 112 and card reader 110, the system detects the return of the cart 160 by its ID number through coded RF signals received through an antenna mounted in the pole 104.

Figure 21:
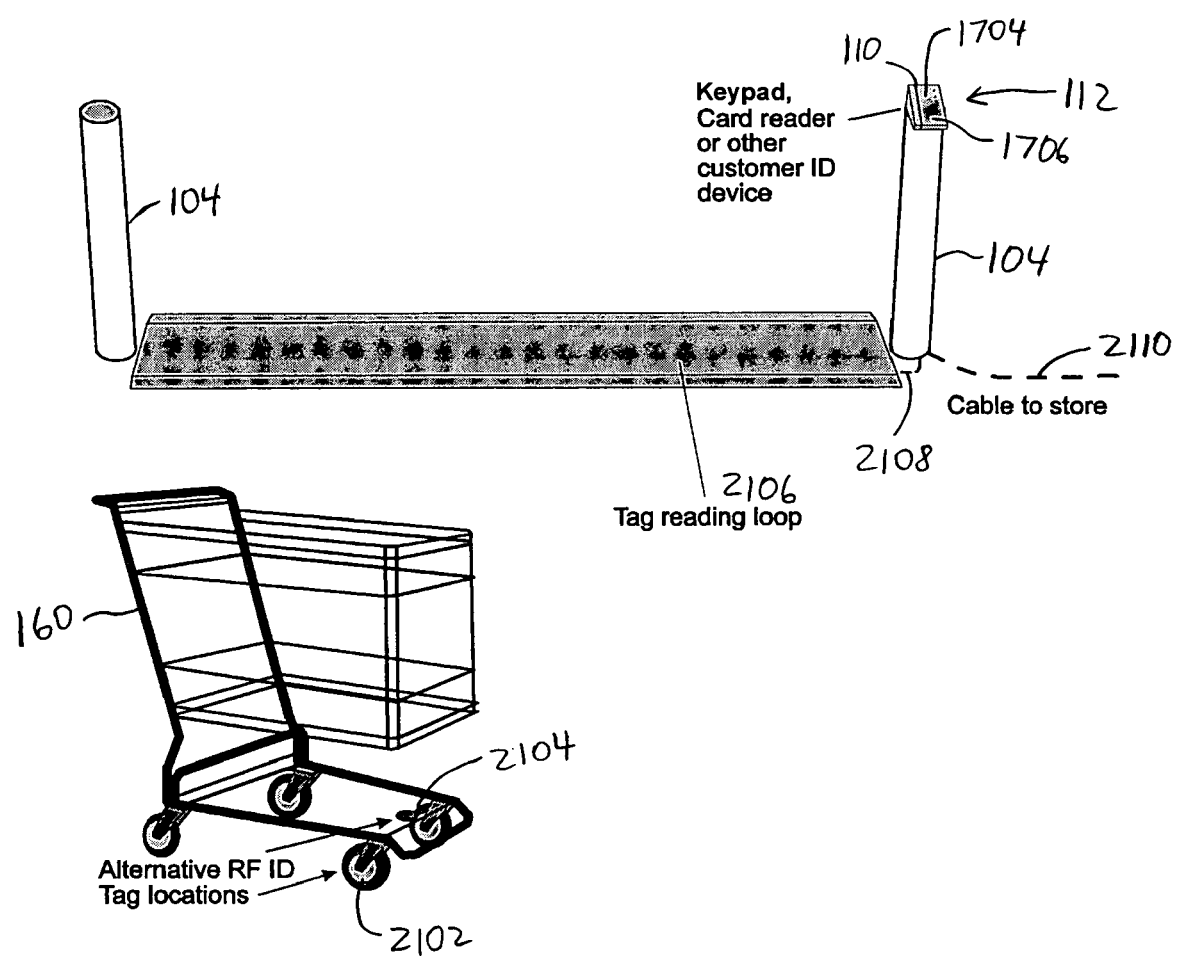
FIG. 21 is a perspective view diagram of a sixth embodiment of a cart, alternative radio frequency identification (RFID) tag locations, alternative antenna panel arrangement, customer ID interface and system electronics arrangement used with a cart corral.

Referring to FIG. 21, a sixth embodiment of a portion of the cart return loyalty credit system 100 will be described. In this embodiment, a single inductive loop RFID reader or receiver antenna 2106 may be molded into a flat plastic panel placed on the pavement surface. Two poles 104 or other guides or markings cause shoppers to return carts 160 over this panel, but there is a large width between the poles, which permits for easy access for the shopping carts. In this embodiment, a RFID tag, such as tags 2102 or 2104, is used on each shopping cart 160, where several alternative RFID tag locations on the cart 160 are shown in FIG. 21. For example, the RFID tag may be embedded in a wheel or caster of the cart 160, attached to a wheel bracket, or attached to a lower frame member of the cart.

The RFID tags each wirelessly transmit a unique serial number corresponding to a particular cart. When a cart is returned over the read antenna panel 2106, a signal corresponding to the unique serial number may be sent via a connector 2108 to the electronics unit 112. The electronics unit 112 includes a RFID tag reader 2302 (FIG. 23) to receive the signal. In one embodiment, the tag reader 2302 includes a receiver circuit, a microprocessor and a magnetic coil. The serial number is then sent to a store computer or to a computing environment via a cable 2110 (or wirelessly in another embodiment) to be recorded. The system 100 thus detects the return of the cart 160 by its serial number through coded RF signals.

The RFID tags 2102 and the RFID tag receiver are well known components and may be obtained from Motorola Inc. and other manufacturers. For example, the RFID tag reader may be a model IR-24E or IR-36E reader, and the RFID tag may be a model IT-52E passive mini disc tag, all available from Motorola Indala.

The electronics unit 112 may also be configured with one or more input and optional output interfaces, such as the reader/scanner/detector 110, a customer identification interface 1704 (FIGS. 17 and 23), and an output interface 1706. The customer identification interface 1704 and the output interface 1706 will be further described hereinbelow.

Cart Detector Circuit and System Electronics

Referring to FIG. 12, one embodiment of a cart detector circuit 200 of the cart return loyalty credit system 100 will be described. In this embodiment, the shopping carts are detected (in cases not using RF ID tags) by a proximity detector using an inductive loop sensor and an oscillator. The circuit of FIG. 12 uses a comparator circuit 202, a 1 kOhm, 3 Watt resistor 204, and two 1.0 $\mu$F film capacitors 206 and 208 to form an oscillator with the loop 102. In one embodiment, the loop is two turns. The presence of the metal in the shopping cart 160 (FIG. 11) causes a slight change in the frequency of the oscillator. This frequency is monitored by a small microcontroller integrated circuit (IC) 210, and if a sufficient change is detected, an output signal 212 indicates the presence of a cart by this loop.

Many different loop oscillator circuits are possible, but one embodiment uses a comparator circuit 202 built into the microcontroller chip 210, such as in the Microchip Technologies PIC16C622 IC. Using the PIC16C622 chip, the "fixed reference voltage" of FIG. 12 is also provided internally by the microcontroller chip.

Figure 18:
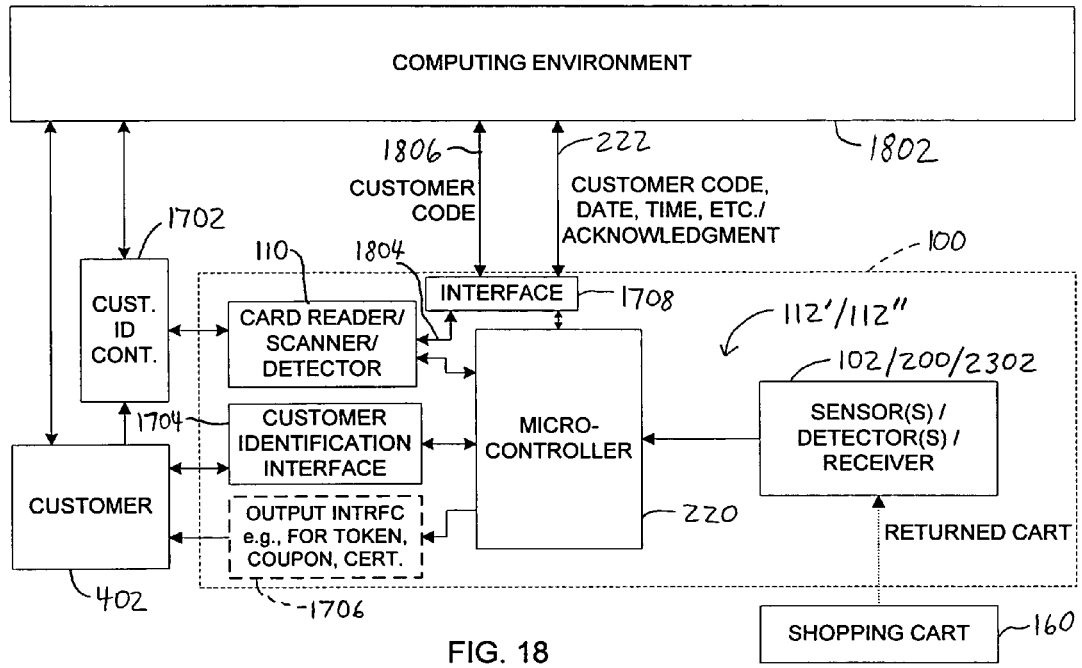
FIG. 18 is a block diagram showing one embodiment of the sensors, system electronics unit, input interfaces and output interfaces combined with a computing environment.

Referring to FIG. 13, one embodiment of the system electronics 112 of the cart return loyalty credit system 100 will be described. In one embodiment, the card reader 110 is integrated with the sensor and control electronics 113 in an enclosure. In another embodiment, the card reader 110 is separated from the enclosure for the system electronics 112. The sensor and control electronics 113 includes two or more cart detector circuits 200a (for loop 102a) and 200b (for loop 102b), a customer card reader 110, another microcontroller, microprocessor, central processing unit (CPU), processor or computing circuitry 220, and an interface 222 to the store computer 420 (FIG. 16) or computing environment 1802 (FIG. 18). The card reader 110 may be, for example, a magnetic stripe reader, such as a Panasonic is model ZU-M1242S1, a bar code reader, or a smart card reader/writer. Note that the smart card device may perform a write on the smart card memory such as to update points or credits for the customer. One microcontroller 220 that may be used is model AT89C51 available from Atmel. The protocol used on the interface to the store computer will depend on the store's computer system itself, and any type protocol could be accommodated. The interface 222 may utilize a serial protocol, such as RS-422, RS-423, RS-449 or RS-485, to communicate with the store computer or computing environment. These exemplary serial protocols are useful for communications distances greater than 50 feet. Power for the circuit, in one embodiment, is provided by AC line power. It will be understood that the microcontrollers 210, 220 could be consolidated into a single microcontroller, microprocessor, CPU, processor, application specific integrated circuit (ASIC), programmable gate array, or any other desired functional partitioning.

Figure 22:
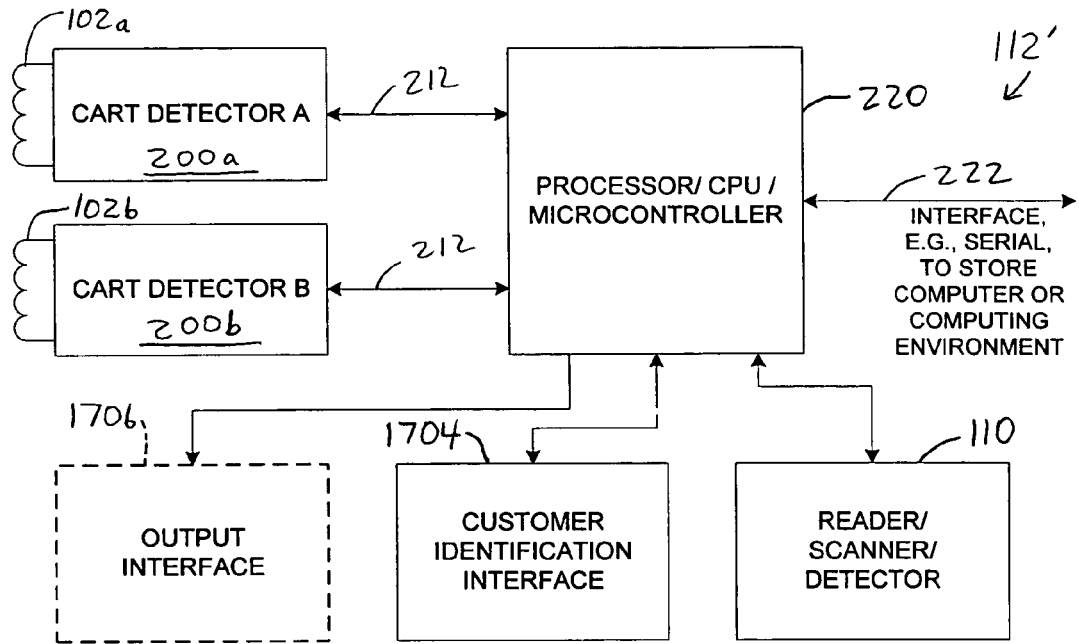
FIG. 22 is a block diagram showing one embodiment of the system electronics, input interfaces and output interfaces shown in any of FIGS. 16–19 or the data processing section shown in FIG. 20.

Referring to FIG. 22, another embodiment of the system electronics 112' of the cart return credit system 100 will be described. The loops 102a and 102b, the cart detectors 200a and 200b, and the processor/CPU/microcontroller 220 are essentially the same as the loops, detectors and microcontroller described in conjunction with FIG. 13. The electronics unit 112' may be configured with two input/output interfaces and an optional output interface, such as the reader/scanner/detector 110, the customer identification interface 1704 (FIG. 17), and the output interface 1706. Having two types of input/output interfaces permits the system 100 to have a backup interface in the event of a failure with one of the interfaces. This capability will be further described in conjunction with FIG. 25. Having two types of input/output interfaces also permits the system 100 to facilitate different ways to obtain a customer identification code from a particular customer. For example, if the customer has a rewards identification card for use with the reader/scanner/detector 110, but left the card at home or in their vehicle, they may use the customer identification interface 1704 to provide either their customer identification code (CIC) or another code, such as their telephone number, that is keyed or mapped to their CIC.

The customer identification interface 1704 may be selected by the store or business from a variety of input or input/output mechanisms or protocols. For example, the interface 1704 may include a keypad similar to those used on a telephone or an ATM machine. Using the keypad, a customer could enter their CIC (if remembered) or could enter their telephone number, which may be mapped to their CIC. Alternatively, the CIC may be the customer's telephone number. Alternatively, the interface 1704 may include an IrDA transceiver, a Bluetooth transceiver, a WAP-compliant transceiver, or a biometrics subsystem or device. Biometrics devices may recognize a unique feature of a particular customer and link to an identification code corresponding to the customer. The unique feature may be a fingerprint, a voice print, a hand outline, a retinal or iris scan, facial recognition, or other unique human characteristics. Manufacturers or providers of biometrics technology or subsystems include Thorn Secure Science, SAFLink Corporation, and Viisage Technology, and others.

The optional output interface 1706 may include a printer, such as an inexpensive narrow carriage dot-matrix printer, a token dispenser, a currency dispenser, and the like. The printer may be used to print coupons, such as for merchandise or services, certificates, and so forth. In one embodiment of the system 100, the output interface 1706 provides a back-up in a situation where the store computer 420 (FIG. 16), computing environment 1802 (FIG. 18), or store interface 222 is not functioning correctly. The output interface 1706 may be configured to print a coupon for merchandise or services, issue a certificate that may be exchanged for points or credits in the rewards program, issue a token that may be exchanged for merchandise, services or cash, and so forth.

Alternatively, the output interface 1706 may be utilized as the primary source of a reward or incentive to the customer. These rewards may include coupons for merchandise or services, tokens that may be exchanged for merchandise, services or cash, and the like. In this type of configuration, the system 100 may not need to be linked to a store computer. In one embodiment, the processor 220 could be configured to store customer information and the corresponding customer points or credits. Alternatively, if a smart card system with smart card reader/writers is utilized, customer points or credits may be stored and maintained on the customer's smart card. When a predetermined point total is reached on the particular smart card, the output device provides a corresponding reward to the customer.

Figure 23:
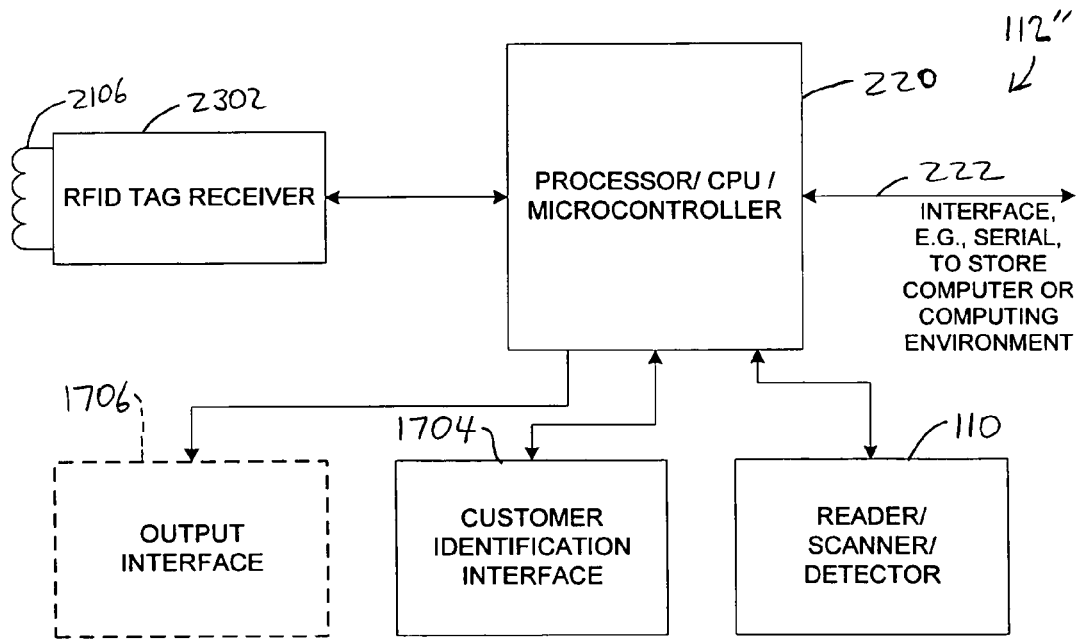
FIG. 23 is a block diagram showing another embodiment of the system electronics, input interfaces and output interfaces shown in any of FIGS. 16–19 or the data processing section shown in FIG. 20.

Referring to FIG. 23, yet another embodiment of the system electronics 112" will be described. In this embodiment, the cart detector function is performed by the RFID tag reader or detector 2302 and tag antenna loop 2106, as described in conjunction with FIG. 21 above. The rest of the system electronics 112" is essentially the same as described in conjunction with FIG. 22.

Software Functions

The microprocessor 220 (FIGS. 13, 17–19, 22, 23) and the data processing section 2002 (FIG. 20) performs two overall functions, effectively in parallel: cart return detection and credit granting. A cart return detection function 300 will be described in conjunction with FIG. 14. A credit granting function 350 will be described in conjunction with FIG. 15. An alternative cart detection function 2400 will be described in conjunction with FIG. 24. An alternative credit granting function 2500 will be described in conjunction with FIGS. 25–27.

Figure 14:
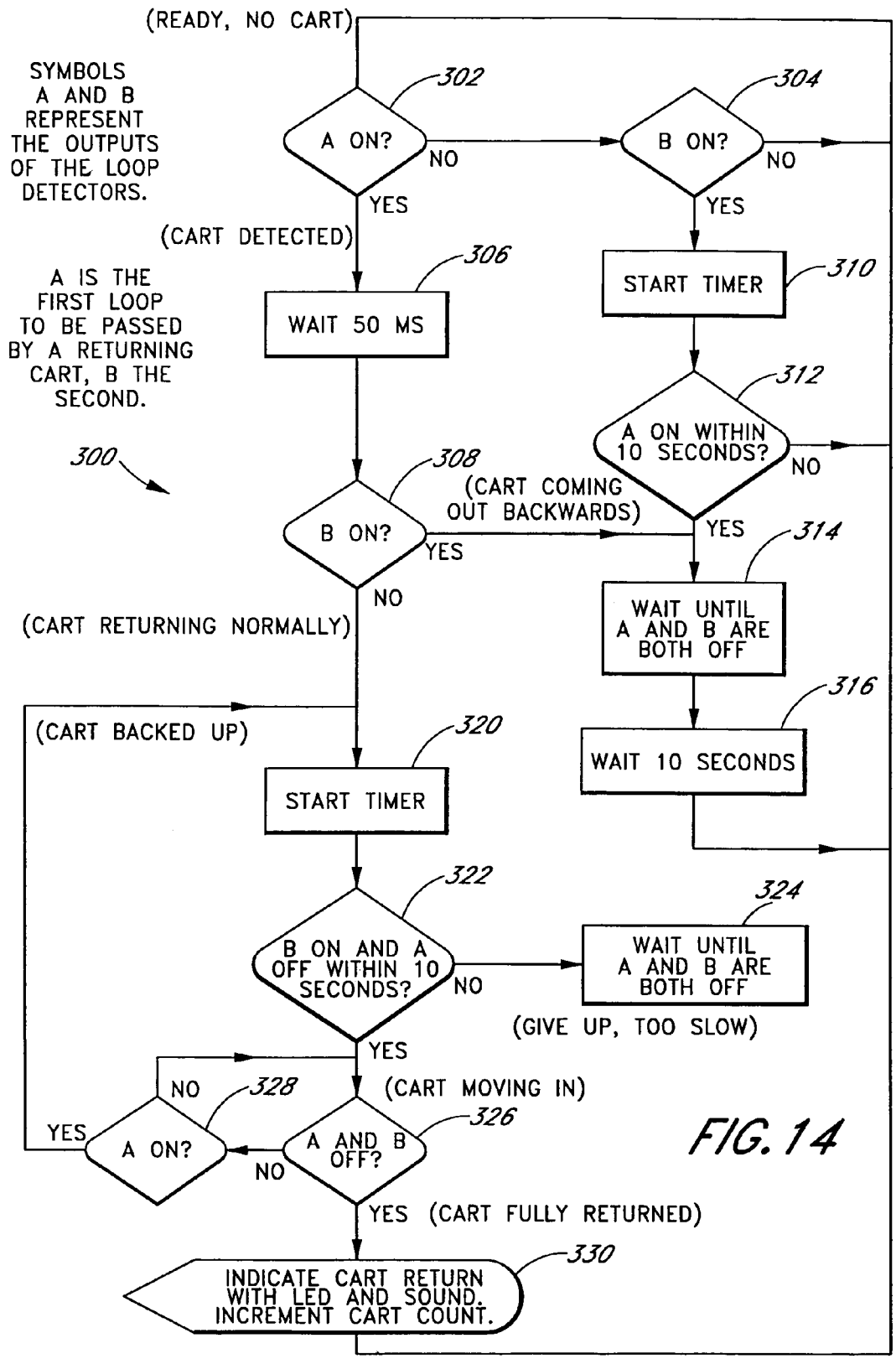
FIG. 14 is a flowchart of a cart return detection function performed by the system electronics unit shown in any of FIGS. 1, 3, 6, 10 or 11.
Figure 16:
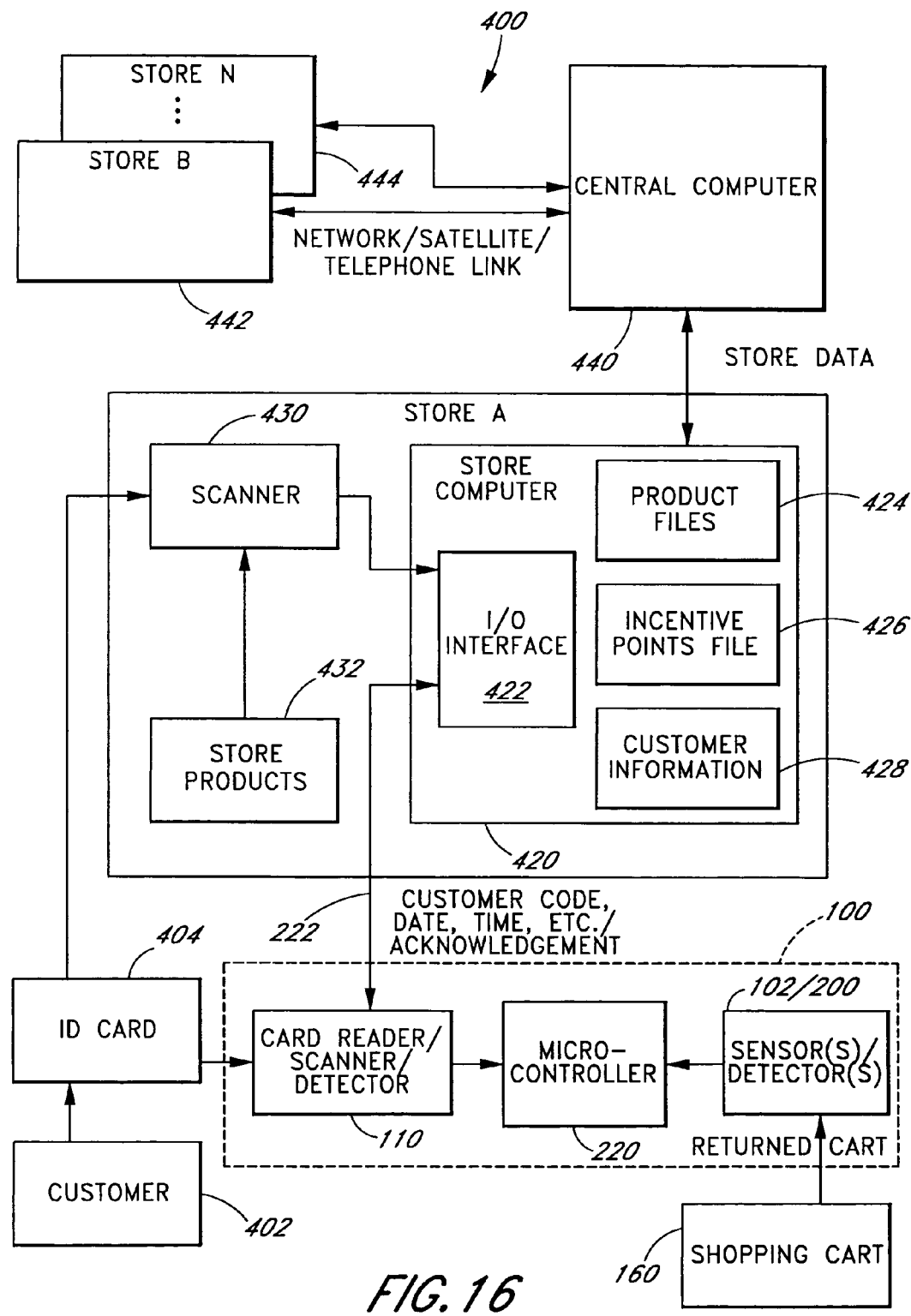
FIG. 16 is a block diagram showing one embodiment of the sensors, system electronics unit and card reader combined with a store infrastructure.

Referring to FIGS. 13 and 14, the microcontroller 220 uses the loop sensors 102 to determine if a cart has been pushed into the cart corral or pulled out. This is determined by looking at the timing of the two "cart detected" signals from one cart lane (loops A and B). If the cart is detected first in the "front" loop, the cart is going in, if first detected in the "rear" loop, the cart is going out. If the cart is going out, this "cart detected" signal is rejected and is ignored by the computer software. Once a cart is pushed all the way into the corral (both detectors indicate no cart present), the software internally records one cart "count". If a customer ID card is "swiped" through the card reader, that customer is credited with returning a cart. The customer ID code data is transmitted through the interface 222 to the store computer 420 (FIG. 16).

Returned carts are counted in a variable, and the count is decremented when a customer swipes a card through the reader 110 and is granted a credit by the store computer. Thus the customer's ID card does not need to be swiped through the card reader 110 immediately. Several carts could be returned and the corresponding customers can swipe their cards through the reader in any order.

Several software features will help deter abuse of the system through "stealing" credits. Only one credit will be granted per customer per unit time. For instance, one credit per eight hours. Of course, this time period could be set to a different time interval. If a cart is detected as being pulled from a particular lane and then a cart (the same or a different cart) is returned through that lane too rapidly (within ten seconds, for instance), that cart return may not be credited.

The flowchart shown in FIG. 14 is one possible embodiment of the cart return detection 300. The symbols A and B represent the outputs of two loop detectors (such as for the embodiment shown in FIG. 3) in the flowchart for the cart return detection function 300 in FIG. 14. The symbol A represents the first loop to be passed by a returning cart and the symbol B represents the second loop. Beginning at a decision state 302 of FIG. 14, function 300 is at a ready condition for a shopping cart. Function 300 periodically checks to see if loop A is on, i.e., a cart has been detected. If not, function 300 proceeds to a decision state 304 to determine if loop B is on. If loop B is determined (by a cart detector 200) to not be on, function 300 proceeds back to decision state 302 to again check if loop A is on. If a determination is made at decision state 302 that loop A is on, function 300 moves to state 306 and waits for an period of 50 msec in one embodiment. The wait period should help if several carts are passed through in rapid succession, and should help reject electrical noise that triggers both A and B sensors simultaneously. Continuing at a decision state 308, function 300 checks to see if loop B is on. If loop B is on at the completion of the wait period of state 306, the cart is deemed to be coming out of the cart corral backwards and function 300 proceeds to state 314. At state 314, function 300 waits until both loops are both off. Proceeding to state 316, function 300 then waits a predetermined time interval, e.g., ten seconds in one embodiment, before moving back to state 302 to be ready to check for loop A again.

If loop A is determined to be off at decision state 302 and loop B is determined to be on at decision state 304, function 300 moves to state 310 and starts a timer. Proceeding to a decision state 312, function 300 determines if loop A becomes on within a predetermined time interval, e.g., ten seconds in one embodiment. If so, the cart is being pulled out backwards from the cart corral and function 300 advances to state 314 to wait until loops A and B are both off. However, if, at decision state 312, it is determined that loop A does not become on within the predetermined time interval, e.g., ten seconds, function 300 moves back to decision state 302 as previously described.

Returning now to decision state 308, if loop B is not on at the completion of the wait period of state 306, the cart is deemed to be normally returned into the cart corral and function 300 proceeds to state 320. At state 320, function 300 starts a timer. Proceeding to a decision state 322, function 300 determines if loop B becomes on and loop A becomes off within a predetermined time interval, e.g., ten seconds in one embodiment. If not, function 300 deems the customer as being too slow to move the cart and gives up processing the current cart. Proceeding to state 324, function 300 waits until loops A and B are both off and then moves back to decision state 302, as previously described. However, if, at decision state 322, it is determined that loop B becomes on and loop A becomes off within the predetermined time interval, e.g., ten seconds, function 300 deems that the cart is moving forward into the cart corral.

Moving to a decision state 326, function 300 determines if both loops A and B are off, i.e., that the cart has passed both loops into the cart corral. If not, function 300 proceeds to a decision state 328 to check if loop A is on. If not, it is deemed that the cart is still being moved into the cart corral and function 300 moves back to decision state 326 to see if loop B has been passed and is off. However, if, at decision state 328, it is determined that loop A is now on, it is deemed that the cart is being backed out of the cart corral and function 300 moves back to state 320 to start the timer as previously described. By going to state 320, the customer may hesitate but still finish returning the cart and receive credit. Also, the apparent backwards motion may only be sensor noise with the cart positioned on the threshold of triggering sensor A. Returning to decision state 326, if it is determined that both loops A and B are now off, i.e., that the cart has passed both loops into the cart corral, function 300 proceeds to state 330 to indicate the completed cart return by activating a LED or other visual indicator and/or activating an aural indicator to generate a sound. The function 300 also increments a "cart count" variable and then moves back to state 302 in a ready condition for another cart.

Figure 24:
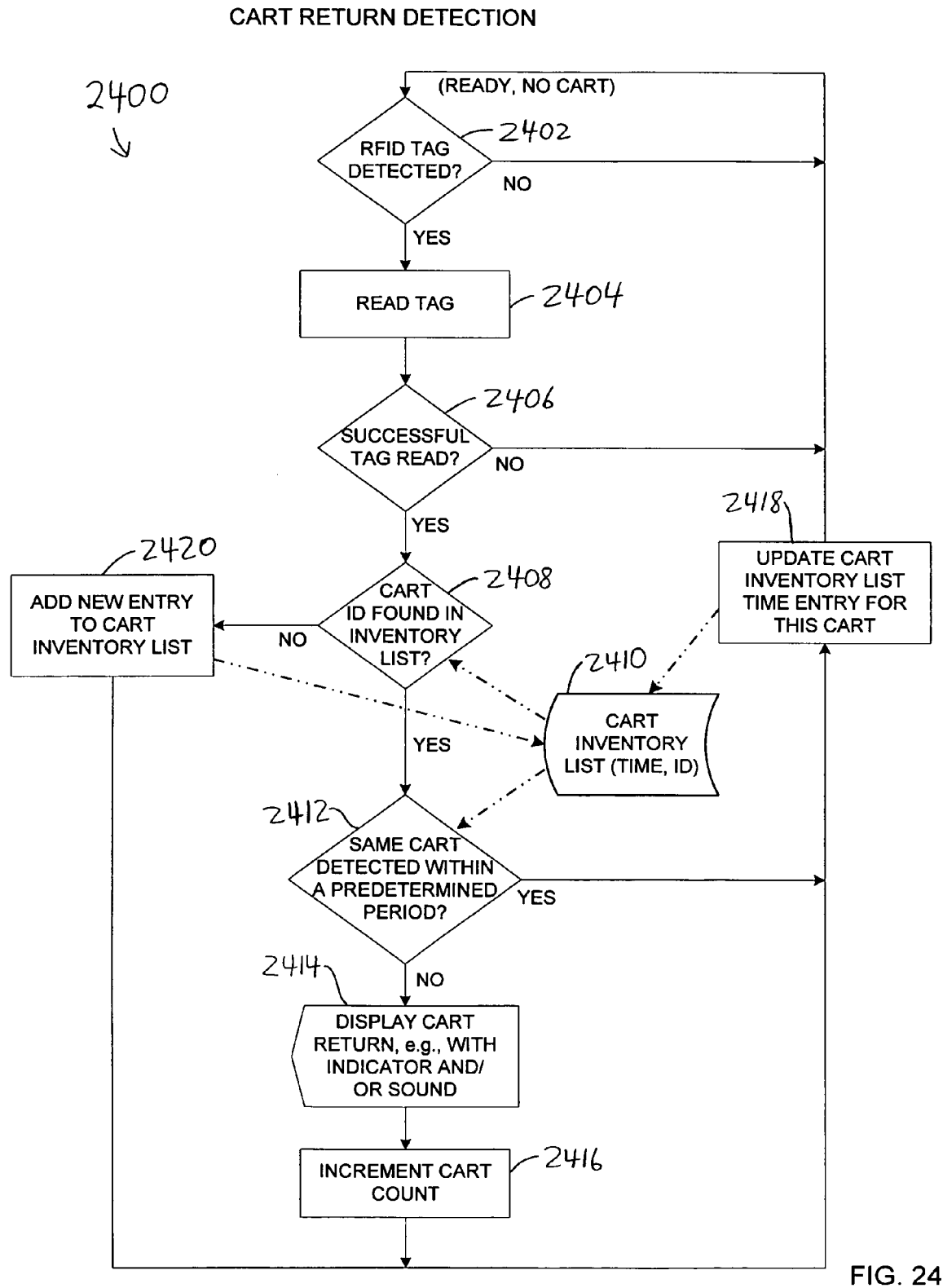
FIG. 24 is a flowchart of a cart return detection function performed by the system electronics shown in FIGS. 21 and 23.

Referring to FIGS. 24 and 23, an alternative embodiment (function 2400) of the cart return detection function 300 of FIG. 14 will be described. If an RFID tag is detected at a decision state 2402, its binary ID code number is read at state 2404. Moving to a decision state 2406, function 2400 determines if the read of the tag ID is successful. If not, function 2400 returns to decision state 2402 to check for a tag again. If the read was successful, as determined at decision state 2406, function 2400 moves to a decision state 2408 where a check is made to determine if the card ID is in a cart inventory list 2410 and to obtain the previous time that this particular cart was detected from the cart inventory list 2410. In one embodiment, the cart inventory list 2410 is kept in the memory of the system microcontroller 220. In one embodiment, records in the inventory list 2410 have a time field and an ID field. If the time since the last previous detection is less than a predetermined minimum period, as determined by a decision state 2412, the presence of the present cart is ignored. In one example, this minimum time period may be set to two minutes, although other time limits are envisioned, such as selected from a range of five seconds to five minutes, for example. This allows the system 100 to ignore carts that remain in the vicinity of the read antenna 2106 after first being detected. Also this deters abuse of the system through "stealing" credits by quickly pulling a cart out of the coral and returning it. If the same cart is not detected at less than the time period utilized at decision state 2412, function 2400 proceeds to state 2414 where the return of the cart is confirmed with a visual indicator and/or a sound, and the cart count variable is incremented by one at state 2416.

If the ID code for a particular cart was not found in the inventory list, as determined at the decision state 2408, function 2400 moves to state 2420. At state 2420, function 2400 adds a new entry or record to the cart inventory list 2410. At the completion of state 2420 (new entry in file), state 2416 (successful cart return), or decision state 2412 (cart detected in less than the time limit), function 2400 advances to state 2418. At state 2418, function 2400 updates the time entry or field for the present cart in the cart inventory list 2410. Function 2400 then proceeds to the decision state 2402 in a ready condition to wait for a cart.

An additional benefit of the inventory list 2410 is that it may be used to automatically inventory the store's carts. The inventory list 2410 may be read by the store computer 420 (FIGS. 16, 17), the central computer 440, or other computing environment (1802) through the interface 222 shown in FIGS. 16, 17 and 23.

Figure 15:
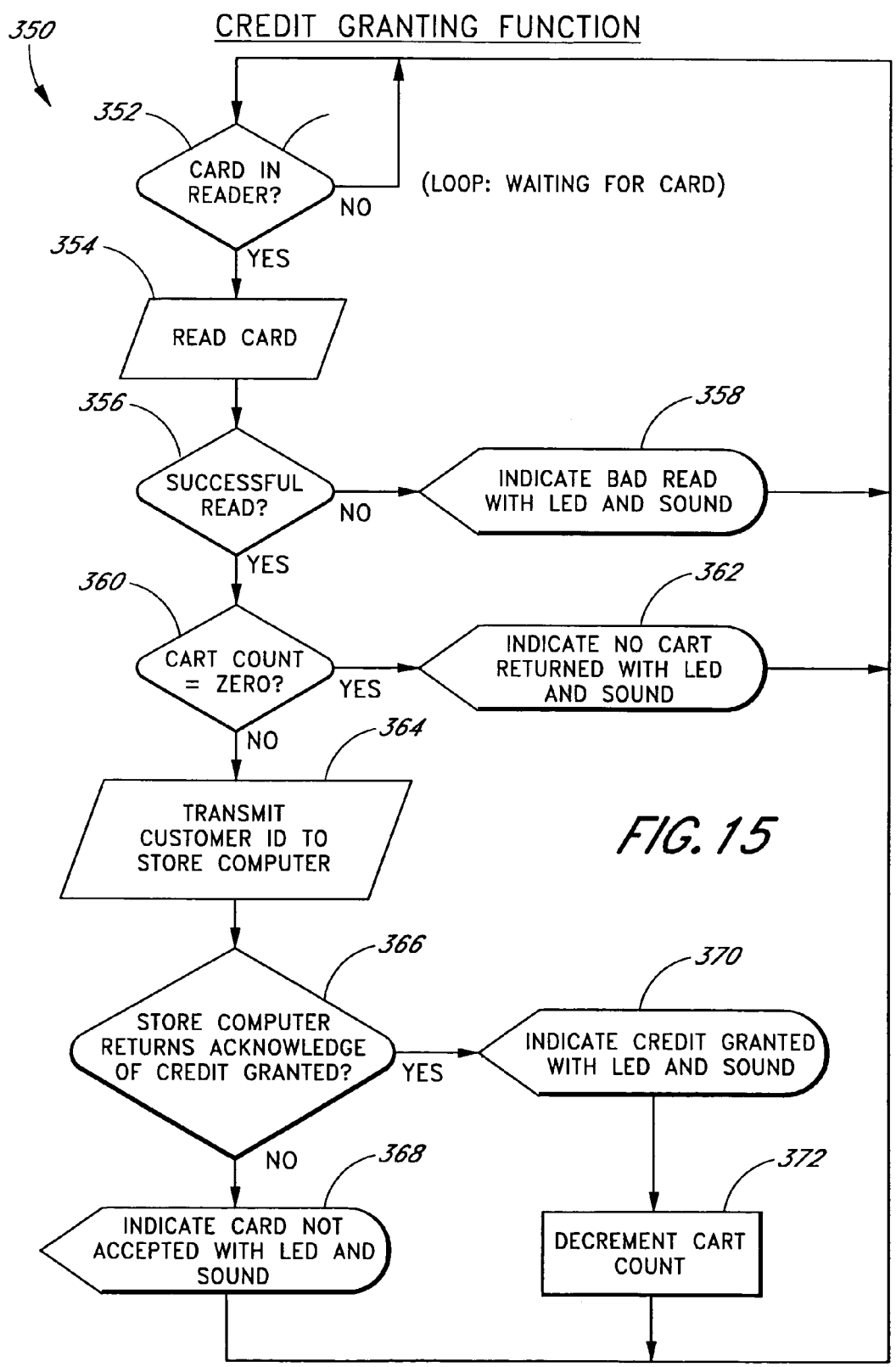
FIG. 15 is a flowchart of a credit granting function performed by the system electronics unit shown in any of FIGS. 1, 3, 6, 10 or 11.

Referring now to FIGS. 13 and 15, the credit granting function 350 will now be described. The software running on the microcontroller 220 provides some indication of a successful cart return and a successful card reading to the customer through one or more light emitting diodes (LEDs) and optionally, audible indications. For example, a green LED and a short bleep tone may be provided when a cart is returned, and a bell tone or coin sound may be provided when a card is successfully swiped through the card reader. A failed card swipe might be indicated by a red LED and another type of sound.

Beginning at a decision state 352 of FIG. 15, function 350 determines if a customer ID card is in the card reader 110. If not, function 350 loops back to decision state 352 to wait for an ID card to be swiped through the reader. When a card is detected in the reader 110, at decision state 352, function 350 reads the data on the ID card at state 354 and advances to a decision state 356 to determine if the read was successful. If the read was not successful, function 350 moves to state 358 to report a bad read by activating a visual indicator, e.g., a LED, and/or activating an audible indicator to generate a sound. At the completion of state 358, function 350 moves back to decision state 352 to check for a card in the reader 110. However, if the read was successful, as determined at decision state 356, function 350 proceeds to a decision state 360 to determine if the "cart count" variable is equal to zero. If so, function 350 advances to state 362 to indicate that no cart was returned by activating a visual indicator and/or an audible indicator. At the completion of state 362, function 350 moves back to decision state 352 to check for a card in the reader 110.

Returning to decision state 360, if "cart count" is not equal to zero, function 350 moves to state 364 and transmits the customer identification code, in one embodiment, to the store computer 420 (FIG. 16). Advancing to a decision state 366, function 350 determines if the store computer returns an acknowledgment that a credit was granted for the customer. If not, function 350 proceeds to state 368 to indicate that the customer ID card was not accepted by the store computer by activating a visual indicator and/or activating an audible indicator. At the completion of state 368, function 350 moves back to decision state 352 to check for a card in the reader 110. However, if the store computer returns an acknowledgment that a credit was granted for the customer, as determined at decision state 366, function 350 continues at state 370. At state 370, function 350 indicates that a customer credit corresponding to the customer ID card was granted by the store computer by activating a visual indicator and/or activating an audible indicator. At the completion of state 370, function 350 moves to state 372 to decrement the cart count variable by one and then moves back to decision state 352 to check for a new card in the reader 110.

Figure 17:
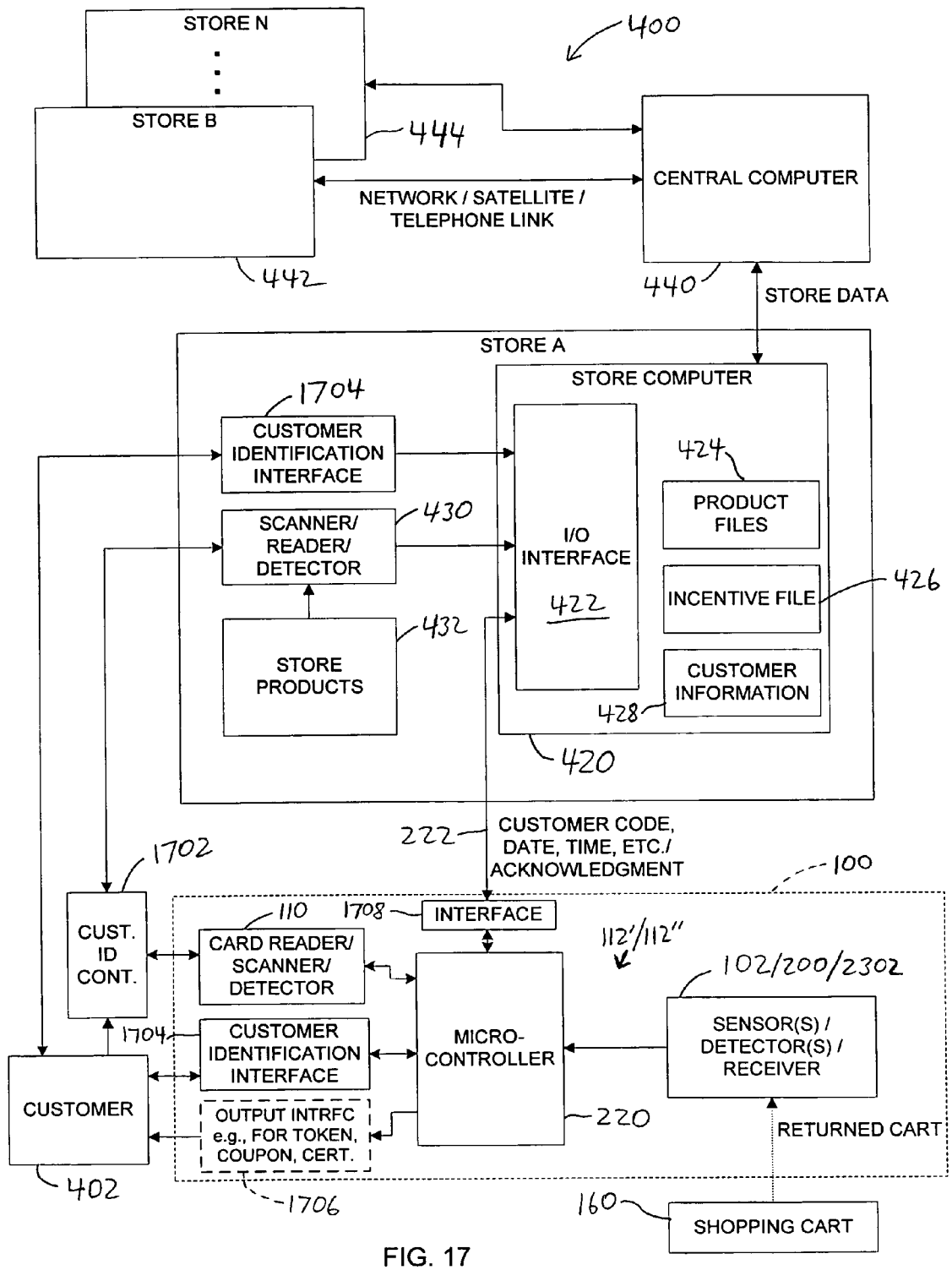
FIG. 17 is a block diagram showing another embodiment of the sensors, system electronics unit, input interfaces and output interfaces combined with a store infrastructure.
Figure 25:
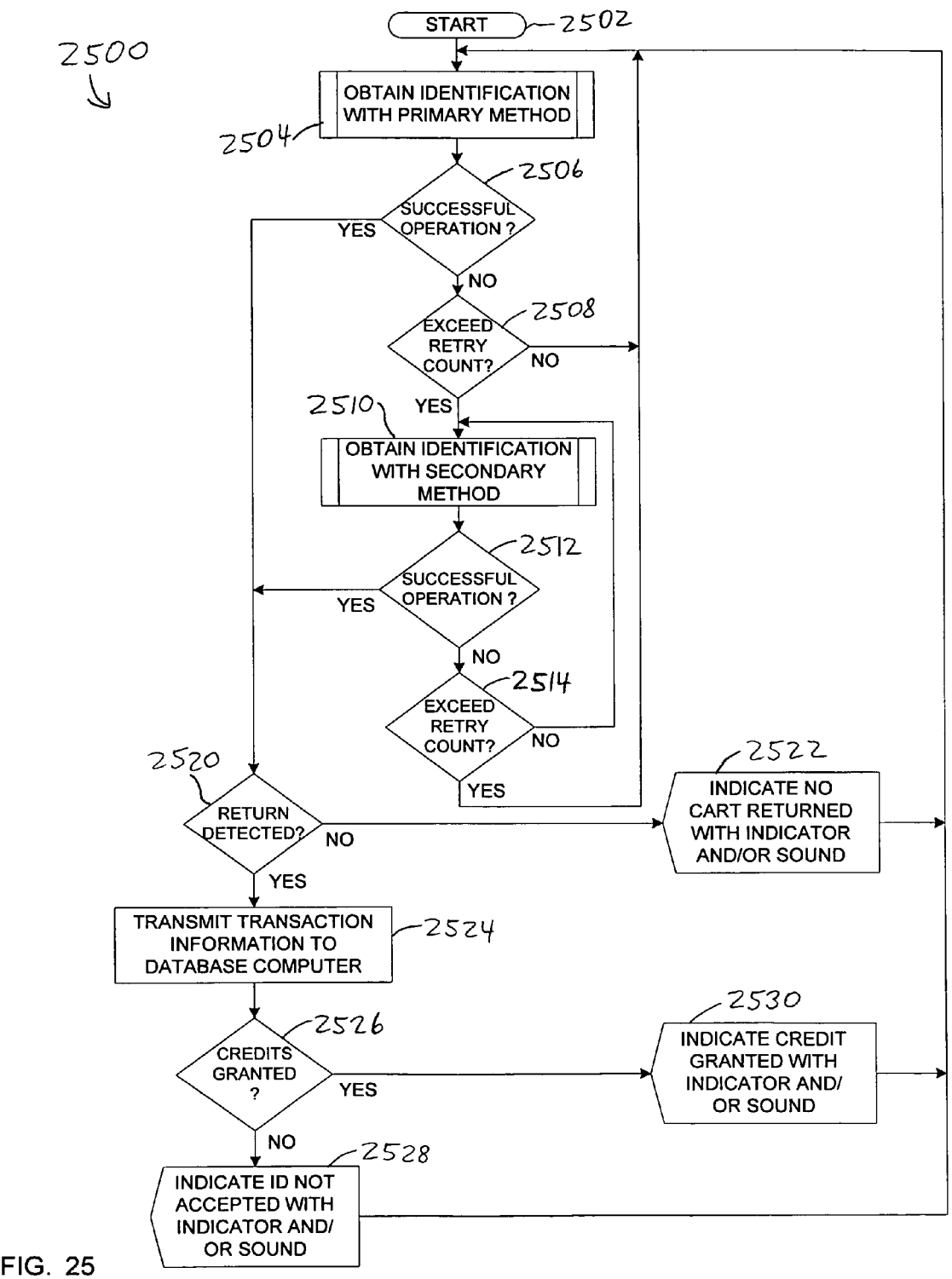
FIG. 25 is a flowchart of a reward points or credits granting function performed by the system electronics shown in any of FIGS. 16–19 or the data processing section shown in FIG. 20.

Referring to FIGS. 25, 22 and 17, an alternative embodiment (function 2500) of the credit granting function 350 of FIG. 15 will be described. Function 2500 takes advantage of the two sources of the customer identification shown in the embodiment of FIG. 22: the reader/scanner/detector 110 and the customer identification interface 1704. If one of these two interfaces fails, the other interface may be used as a secondary or back-up interface. Having two types of input/output interfaces also permits the system 100 to facilitate different ways to obtain a customer identification code from a particular customer, as described above.

Beginning at a start state 2502, function 2500 moves to an Obtain Identification With Primary Method process 2504. This process 2504 may utilize one of the interfaces as selected by a customer. For example, the customer may attempt to use their smart card or their magnetic stripe card with the reader/scanner/detector 110. If so, function 2500 calls a card reader process 2600 (FIG. 26) to perform the Obtain Identification With Primary Method process 2504. However, if the customer first attempted to use a keypad embodiment of the customer identification interface 1704 instead of the card reader, function 2500 calls a keypad process 2700 (FIG. 27) to perform the Obtain Identification With Primary Method process 2504. If other embodiments (e.g., wireless transceiver or biometrics subsystem) of the customer identification interface 1704 are used instead of the keypad, function 2500 calls a corresponding process appropriate to the particular embodiment to obtain the customer ID and perform the Obtain Identification With Primary Method process 2504.

At the completion of the Primary process 2504, function 2500 moves to a decision state 2506 to determine if process 2504 successfully obtained the customer ID. If not, function 2500 proceeds to a decision state 2508 to determine if a retry count for the input interface has been exceeded. If not, function 2500 moves back to the Primary process 2504 to attempt to obtain the customer ID again. For example, the customer may swipe their magnetic stripe card through the card reader 110 again. A loop of the Primary process 2504 and decision states 2506 and 2508 is repeated until either the customer ID is successfully obtained or the retry count is exceeded.

If the retry count is exceeded, as determined at the decision state 2508, function 2500 proceeds to an Obtain Identification With Secondary Method process 2510. This process 2510 utilizes the "back-up" or secondary interface, i.e., an interface that was not selected by the customer to perform process 2504 above. The secondary interface (110 or 1706), or in another embodiment of the system, another embodiment of the same interface (a keypad or wireless transceiver or biometrics subsystem for the interface 1704, or a magnetic stripe reader or smart code reader/writer or bar code reader or check magnetic ink character recognition (MICR) code reader for the interface 110), and its corresponding process is then used by Secondary process 2510. For example, if the card reader process 2600 was performed by the Obtain Identification With Primary Method process 2504, then the keypad process 2700 (or other corresponding process for other embodiments of the interfaces) may be performed by the Obtain Identification With Secondary Method process 2510.

At the completion of the Secondary process 2510, function 2500 moves to a decision state 2512 to determine if process 2510 successfully obtained the customer ID. If not, function 2500 proceeds to a decision state 2514 to determine if a retry count for the input interface has been exceeded. If the retry count is not exceeded, function 2500 moves back to the Secondary process 2510 to attempt to obtain the customer ID again. A loop of the Secondary process 2510 and the decision states 2512 and 2514 is repeated until either the customer ID is successfully obtained or the retry count is exceeded.

If the retry count is exceeded, as determined at the decision state 2514, function 2500 proceeds to the Obtain Identification With Primary Method process 2504, as described above. However, if the customer ID is successfully obtained, as determined by either of the decision states 2506 or 2512, function 2500 advances to a decision state 2520 to determine if a return of a cart has been detected. If not, function 2500 proceeds to state 2522 to report or indicate to the customer that a cart was not returned by activating a visual indicator, e.g., a LED, or a display, and/or activating an audible indicator to generate a sound. If the customer is using a wireless hand-held device to communicate with the system 100, the indication may be displayed on the wireless device. If a return of a cart has been detected, as determined at decision state 2520, function 2500 proceeds to state 2524 where transaction information is transmitted to a database computer (e.g., store computer 420) having the incentive file 426 (FIG. 17). The transaction information may include the customer ID, date and time of obtaining the customer ID, location of the interface, and so forth.

Moving to a decision state 2526, function 2500 determines if the computer granted credit to the customer. If so, function 2500 advances to state 2530 to indicate to the customer that credit was granted by activating a visual indicator, e.g., a LED, or a display, and/or activating an audible indicator to generate a sound. If credit is not granted to the customer, as determined at decision state 2526, function 2500 advances to state 2528 to indicate to the customer that credit was not granted and the ID was not accepted by activating a visual indicator, e.g., a LED, or a display, and/or activating an audible indicator to generate a sound. At the completion of any of states 2522, 2528 or 2530, function 2500 moves back to the Obtain Identification With Primary Method process 2504.

In another embodiment of the system 100, the customer ID or transaction information is not transmitted to the store computer as in state 2524, but is utilized by the processor 220 in a "stand-alone" mode. In such a mode, the processor 220 may return an acknowledge signal which is then checked at decision state 2526 so as to indicate whether credits were granted or that the customer ID was not accepted.

Figure 26:
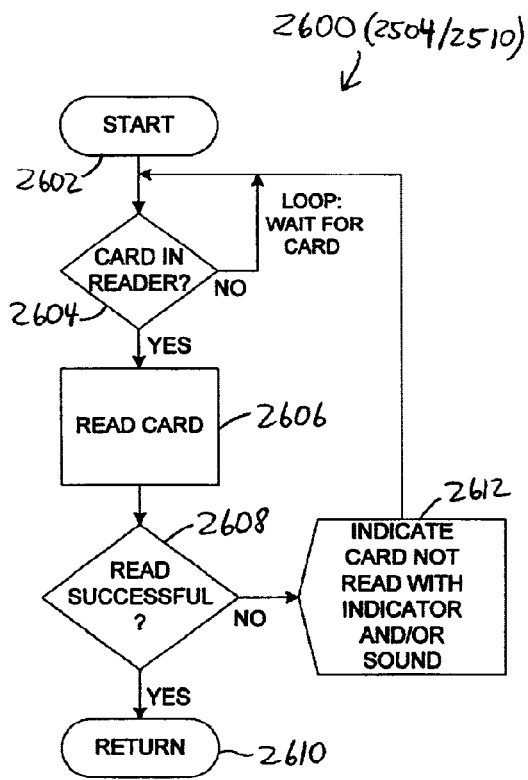
FIG. 26 is a flowchart of the obtain identification with primary method process or the obtain identification with secondary method process defined in FIG. 25, such as performed by the card reader of FIGS. 17–19 and 21–23.

Referring to FIG. 26, the card reader process 2600 corresponding to the Obtain Identification With Primary Method process 2504 or the Obtain Identification With Secondary Method process 2510 of FIG. 25 will now be described. Beginning at a start state 2602, process 2600 moves to a decision state 2604 to determine if a customer ID card is in the card reader 110. If not, process 2600 loops back to the decision state 2604 to wait for an ID card to be in the reader 110. When a card is detected in the reader 110, as determined at decision state 2604, process 2600 reads the data on the ID card at state 2606 and advances to a decision state 2608 to determine if the read was successful. If the read was not successful, process 2600 moves to state 2612 to report that the card was not read by activating a visual indicator, e.g., a LED, and/or activating an audible indicator to generate a sound. At the completion of state 2612, process 2600 moves back to decision state 2604 to check for a card in the reader 110. However, if the read was successful, as determined at decision state 2608, process 2600 returns to the function 2500 (FIG. 25) at a return state 2610.

Figure 27:
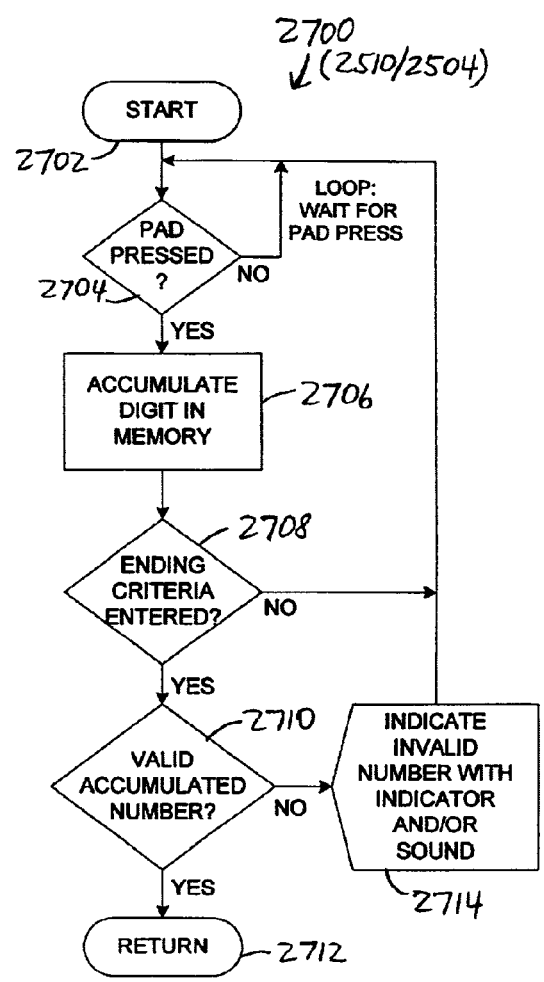
FIG. 27 is a flowchart of the obtain identification with primary method process or the obtain identification with secondary method process defined in FIG. 25, such as performed by the customer identification interface of FIGS. 17–19 and 21–23.

Referring to FIG. 27, the keypad process 2700 corresponding to the Obtain Identification With Primary Method process 2504 or the Obtain Identification With Secondary Method process 2510 of FIG. 25 will now be described. Beginning at a start state 2702, process 2700 moves to a decision state 2704 to determine if a key of the keypad embodiment of the interface 1704 has been depressed. If not, process 2700 loops back to the decision state 2704 to wait for a key to be pressed. When a key is depressed, as determined at decision state 2704, process 2700 accumulates the pressed digit or character in a buffer or memory at state 2706 and advances to a decision state 2708 to determine if an ending criteria for the ID is entered or reached. For example, the ending criteria may be a predetermined number of digits or characters for the ID, or it may be certain key or symbol on the keypad, such as the "#" key. If the ending criteria is not reached or entered, as determined at decision state 2708, process 2700 loops back to decision state 2704 to wait for another key to be pressed. If the ending criteria is entered, as determined at decision state 2708, process 2700 continues at a decision state 2710 to determine if the accumulated digits or characters are a valid customer ID according to predetermined criteria. The predetermined criteria may be, for example, a sufficient number of digits in the ID. If the accumulated digits or characters are not valid, process 2700 moves to state 2714 to report an invalid ID by activating a visual indicator, e.g., a LED, and/or activating an audible indicator to generate a sound. At the completion of state 2714, process 2700 moves back to decision state 2704 to check for a key press on the keypad. However, if the accumulated digits or characters are valid, as determined at decision state 2710, process 2700 returns to the function 2500 (FIG. 25) at a return state 2712.

Store and Enterprise Connectivity

Referring to FIG. 16, the combination of the cart return loyalty credit system 100 with a store network 400 will be described. In one embodiment, the system 100 is integrated with an existing frequent shopper program for a particular store or chain of stores. Alternatively, the system 100 could be incorporated in another reward or sales program such as a prepaid phone card or video rental card program.

In one embodiment, the retailer "collects" a customer's credits and issues them at a point of sale as discounts, freebies, phone card credits, etc. The system may also get manufacturers, e.g., Coca Cola, to give "specials" from time to time in return for credits, thus shifting the cost of credits from the retailer to the manufacturer (e.g., Coke or Coors).

When a customer 402 joins a particular shopping program, a customer ID (reward) card 404 having a customer ID number or code is issued to the customer. This ID code may be encoded on the card 404 as a bar-code, in a magnetic stripe, or stored in the memory of a smart card, for instance. In another embodiment, the store may use identification information on a customer's debit card, credit card, or the account information (e.g., via MICR) on the customer's checks, for example, as a customer code so as to avoid having to issue another card to the customer. To maintain security of the code, it could be encrypted at the sensor and control electronics 113 and decrypted by a store or central computer. The store may also allow use of either a debit/credit card, check or a reward card, depending on whether the customer is paying for the purchase by debit, credit, check, or cash. A customer 402 receives frequent shopper or reward credits, points, or the like for purchases, store visits, and other criteria as defined by the particular frequent shopper program. For example, when the customer purchases store products 432 at store A (410), the products are scanned by a scanner 430 or similar device, e.g., reader, detector, at a checkout point-of-sale (POS) location. The customer 402 receives credits based on the purchases to the account identified by customer code on the ID card 404, or other identification as described above, which is scanned or read by scanner 430 or other identification input device.

These credits or points, the customer identification, the identity of the purchased products, date and time information are passed on to an input/output interface 422 of the store computer 420. The purchased product information is stored in product files 424 and the credits are stored in an incentive file 426 which is indexed by customer code. Time and date information for the transaction may be stored for both files 424 and 426. Customer information, such as provided by the customer when the ID card 404 was issued, is stored in file 428. Information on products purchased by the customer and other information learned about the customer may also be stored in the customer file 428.

If the store belongs to a chain (of stores) or is affiliated in some way with other stores having a frequent shopper program, store A may communicate store data periodically to a central computer or computer network 440. Store B (442), and other stores through store N (444) may also communicate with the central computer 440 via a link, such as, for example, a network, a satellite or a telephone link. The network link may be an intranet, an extranet, or an Internet link.

The actual reward of a particular frequent shopper program may vary between various businesses and campaigns. One type of reward is a reward certificate, which could be a voucher for cash or product purchases at the business that issued the reward card, or the reward certificate could be a negotiable check. Furthermore, an affinity relationship could be established where the frequent shopper receives points in another frequent purchaser plan such as airline frequent flyer miles.

By use of the cart return loyalty credit system 100, a customer 402 receives frequent shopper credits for returning the shopping cart 160 to the store's cart corral or other designated location. The loop sensors 102, in conjunction with the cart detectors 200, detect a returned cart 160 and signal the microcontroller 220 of that event. The customer 402 then uses his ID card 404 in the card reader 110, or card scanner or detector in another embodiment, to provide his customer ID or code to the microcontroller 220. The microcontroller sends the customer code, date, time and any other information, such as a cart corral identification code, to the store computer 420 via the interface line 222. Alternatively, the information may be sent directly to the central computer 440. The store computer then provides an acknowledgment signal to the microcontroller 220 so as to notify the customer of a successful reward credit transaction.

Referring to FIG. 17, an alternative embodiment of the cart return credit system 100 with the store network 400 will be described. Many of the components of the embodiment shown in FIG. 17 are substantially similar to the components of the embodiment shown in FIG. 16, and thus, these components will not be described again. FIG. 17 shows how the system electronics 112' (FIG. 22) or system electronics 112" (FIG. 23) for the system 100 may be combined with the store network 400.

When a customer 402 joins a particular shopping program, a customer ID container 1702 having a customer ID number or code may be issued to the customer. This may take the form of an ID card. The ID code may be encoded on the card as a bar-code, in a magnetic stripe, or stored in the memory of a smart card, for instance. In another embodiment, the store may use identification information on a customer's debit card, credit card, or the account information (e.g., via MICR) on the customer's checks, for example, as a customer code so as to avoid having to issue another card to the customer. Other ways of providing the customer ID to the system may not require the customer ID container 1702, such as, for example, the use of the keypad, biometrics subsystem, or wireless transceiver embodiments of the customer identification interface 1704. A wireless telephone may be used to call a prespecified telephone number, e.g., a toll-free number associated with the store or the rewards program, and the caller's automatic number identification (ANI) or caller-ID may be used as the customer ID. If the customer has a handheld computing device, a store may provide a rewards software program for the device. The software program stores the customer ID, and optionally, a record of credits or reward points in the device.

The customer 402 receives credits based on the purchases to the account identified by customer code on the ID card 404, or other identification as described above, which is scanned or read by the scanner 430 or entered via the customer identification interface 1704. For example, if the customer has forgotten to bring his or her customer ID container 1702 to the store, the customer may enter their customer ID, or a set of characters, such as their telephone number, keyed to their customer ID on the keypad. The customer ID or code is then sent to the microcontroller 220. The microcontroller sends the customer code, date, time and any other information, such as a cart corral identification code, through an interface 1708 to the store computer 420 on the interface line 222. Alternatively, the information may be sent directly to the central computer 440 or other computing environment 1802 (FIG. 18).

Figure 19:
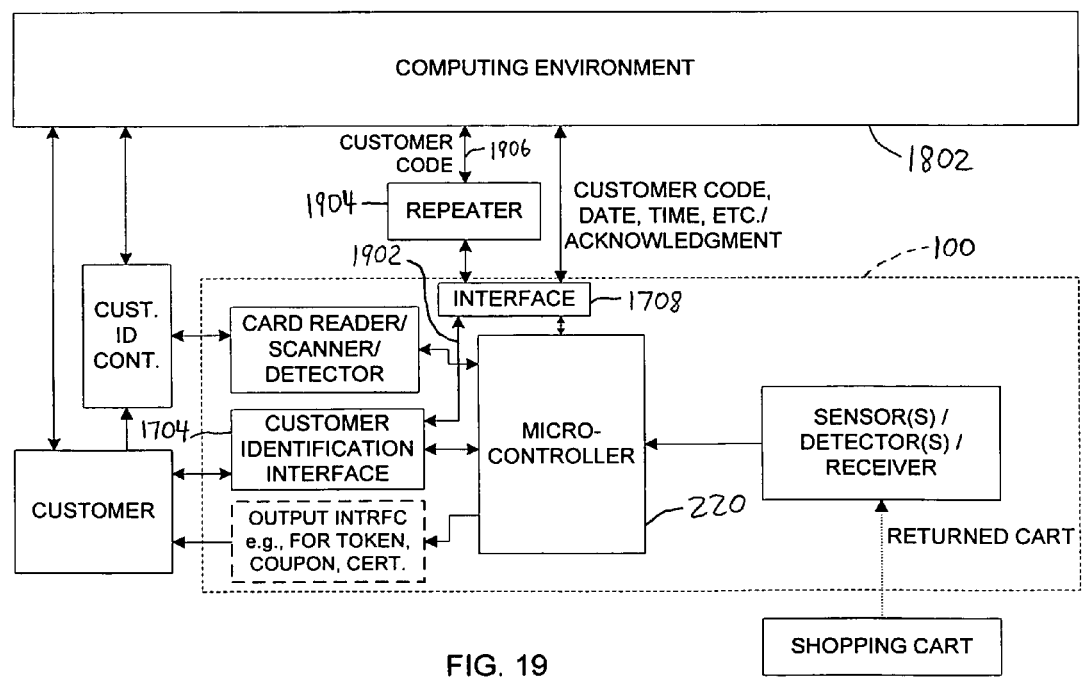
FIG. 19 is a block diagram showing another embodiment of the sensors, system electronics unit, input interfaces and output interfaces combined with a computing environment.
Figure 20:
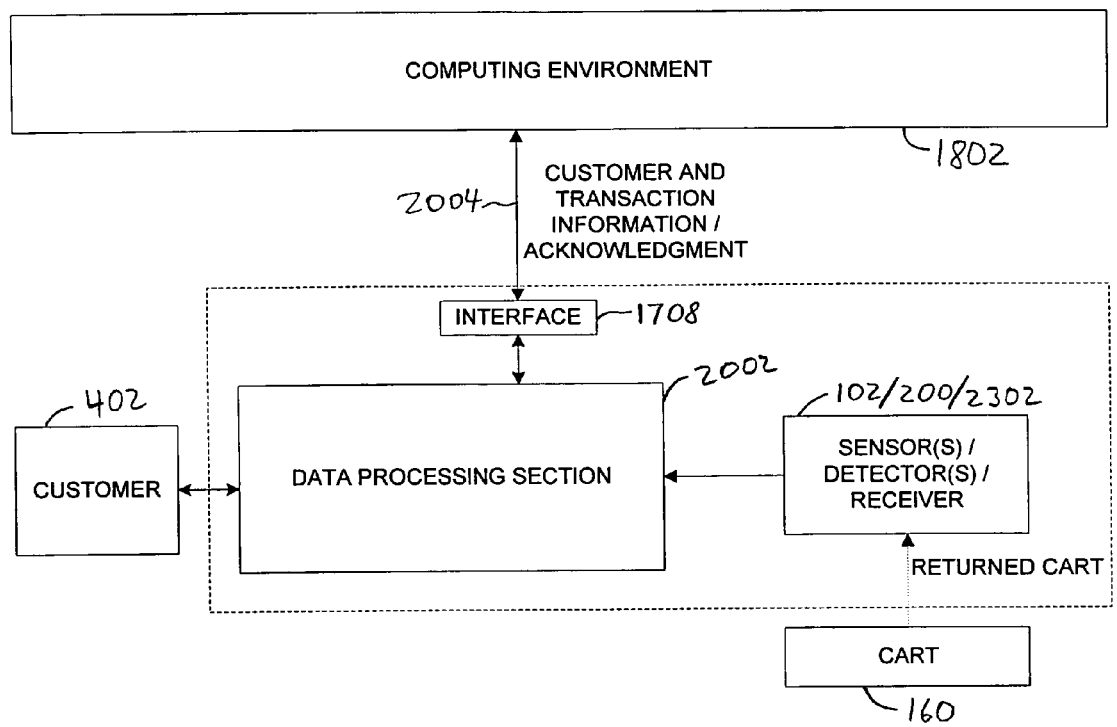
FIG. 20 is a block diagram showing one embodiment of the sensors and data processing section combined with a computing environment.

Referring to FIGS. 18, 19 and 20, other alternative embodiments of the cart return credit system 100 with a computing environment 1802 will be described. Many of the components of the embodiments shown in FIGS. 18–20 are substantially similar to the components of the embodiments shown in FIGS. 16 and 17, and thus, these components will not be described again. FIGS. 18 and 19 show how the system electronics 112' (FIG. 22) or system electronics 112" (FIG. 23) for the system 100 may be combined with the computing environment 1802. One embodiment of the computing environment 1802 may be the store network 400.

The embodiments shown in FIGS. 18 and 19 utilize alternative paths for the customer ID or code to be sent to the computing environment 1802. In FIG. 18, the customer ID code may be sent from the card reader/scanner/detector 110 via a path 1804 to the interface 1708 and then on to the computing environment 1802 via interface path 1806. Using path 1804, the system 100 bypasses sending the customer code through the microcontroller 220. The paths 1806 and 1804 may also be used for communication to the reader/scanner/detector 110. For example, if the user has a smart card (1702), the computing environment 1802 may send information to the smart card reader/writer (110).

In FIG. 19, the customer ID code is sent from the customer identification interface 1704 via a path 1902 to the interface 1708 and then on to the computing environment 1802 through a repeater 1904 (or similar component) via interface link 1906. Repeaters for wireless communication are well known in the field of communication technology. Using path 1902, the system 100 bypasses sending the customer code through the microcontroller 220. The link 1906 and path 1902 may also be used for return communication to the interface 1704, such as, for example, a points total or an acknowledgement signal. For example, if a wireless transceiver embodiment of interface 1704 was utilized, the repeater 1904 may be used to increase the distance between the system 100 and the computing environment 1802.

In FIG. 20, a data processing section 2002 communicates with the customer 402 to receive customer identification and provide return data or information to the customer. The data processing section 2002 is in data communication with the computing environment 1802 through the interface 1708 on a link or path 2004. Information transmitted on the link or path 2004 includes customer and transaction information and acknowledgment signals. The data processing section 2002 is also in communication with the cart sensors/detectors/reader 102/200/2302 which detect a returned cart 160.

While the above detailed description has shown, described, and pointed out the fundamental novel features of the invention as applied to various embodiments, it will be understood that various omissions and substitutions and changes in the form and details of the system illustrated may be made by those skilled in the art, without departing from the concepts of the invention.

What is claimed is:

1. A cart system, comprising:
    a sensor transmitting cart return signals when a cart is returned to a cart corral;
    a plurality of customer identification signals each unique to a specific customer which are entered at the cart corral or transmitted from a customer device when the specific customers return carts to the cart corral; and
    a data processing section receiving the cart return signals from the sensor and the customer identification signals so as to associate each returned cart with a specific customer for a customer reward program.

2. A cart return system, comprising:
    a sensor transmitting cart return signals when a cart is returned to a cart corral;
    a first interface which receives a first set of customer identification signals from a customer;
    a second interface which receives a second set of customer identification signals from a customer; and
    a data processing section associating at least one of the sets of customer identification signals with the cart return signal received from the sensor for a customer rewards program.

3. The system defined in claim 2, wherein the data processing section receives both the first and second sets of signals from the customer.

4. The system defined in claim 2, wherein the data processing section receives the second set of signals due to a failure of the first interface.

5. A cart return system for use by a store, the system comprising:
    a detection loop arranged at the entrance to a cart return location;
    a cart detection circuit connected to the detection loop being configured for detecting a change of inductance of the loop and identifying a cart detected condition; and
    a processing circuit, connected to the cart detection circuit, being configured for identifying a cart return condition in response to the cart detected condition, wherein the processing circuit is configured to receive a customer identification which is unique to a specific customer and which is input to the system by the customer who returns the cart to the cart return location, and to associate the customer identification with the cart return condition.

6. The system defined in claim 5, wherein the cart detection circuit includes a loop oscillator circuit connected to the detection loop.

7. The cart return system defined in claim 6, wherein the cart detection circuit includes a control circuit detecting a change in inductance of the loop so as to specify the cart detected condition in response to the loop oscillator circuit.

8. The system defined in claim 5, additionally comprising an output interface connected to the processing circuit, wherein the processing circuit generates an output signal for the output interface based on the cart return condition and the customer identification.

9. The system defined in claim 8, wherein the output signal is indicative of a reward for a specific customer of the store associated with said customer identification.

10. The system defined in claim 8, wherein the output interface provides a reward to a specific customer of the store associated with said customer identification.

11. The system defined in claim 5, wherein the processing circuit includes a customer identification interface that provides the customer identification responsive to the cart return condition.

12. The system defined in claim 11, wherein the customer identification interface is a keypad.

13. The system defined in claim 11, wherein the customer identification interface is a smart card reader.

14. The system defined in claim 11, wherein the customer identification interface comprises a wireless transceiver.

15. The system defined in claim 11, wherein the customer identification interface comprises a biometrics subsystem.

* * * * *